US007650602B2

(12) United States Patent
Amamiya et al.

(10) Patent No.: US 7,650,602 B2
(45) Date of Patent: Jan. 19, 2010

(54) PARALLEL PROCESSING COMPUTER

(75) Inventors: Makoto Amamiya, Fukuoka (JP);
Satoshi Amamiya, Fukuoka (JP);
Takanori Matsuzaki, Kasuga (JP)

(73) Assignee: Kyushu University, Fukuoka (JP)

( * ) Notice: Subject to any disclaimer, the term of this patent is extended or adjusted under 35 U.S.C. 154(b) by 1334 days.

(21) Appl. No.: 10/992,675

(22) Filed: Nov. 22, 2004

(65) Prior Publication Data

US 2005/0240930 A1    Oct. 27, 2005

(30) Foreign Application Priority Data

Mar. 30, 2004    (JP) .............................. 2004-098213

(51) Int. Cl.
*G06F 9/46*    (2006.01)
(52) U.S. Cl. ........................ 718/104; 718/102; 718/106
(58) Field of Classification Search ................. 718/104, 718/102, 106
See application file for complete search history.

(56) References Cited

U.S. PATENT DOCUMENTS 6,212,542 B1 *    4/2001    Kahle et al. ................. 718/102

OTHER PUBLICATIONS

"FUCE Processor for Fusing Communication and Execution;" Matsuzaki et al.; Graduate School of Information Science and Electrical Engineering, Kyushu University; Technical Report of IEICE, Aug. 2000.
"Design and Implementation of Multithreaded Processor for Real-Time Operation;" Utiyama et al.; Department of Information and Computer Science, Faculty of Science and Technology, Keio University, Kanagawa, Japan; Technical Report of IEICE, Mar. 2000.
"An α-Coral Processor Based on Single Chip Multithreaded Architecture;" Kawahara et al.; Parallel Processing Symposium, Jun. 2001.

* cited by examiner

*Primary Examiner*—Meng-Ai An
*Assistant Examiner*—Camquy Truong
(74) *Attorney, Agent, or Firm*—Oliff & Berridge, PLC

(57) ABSTRACT

There is provided a parallel processing computer for executing a plurality of threads concurrently and in parallel. The computer includes: a thread activation controller for determining whether or not each of threads, which are exclusively executable program fragments, is ready-to-run, to put the thread determined ready-to-run into a ready thread queue as ready-to-run thread; and a thread execution controller having a pre-load unit, an EU allocation and trigger unit, a plurality of thread execution units and a plurality of register files including a plurality of registers, and the pre-load unit, prior to when each ready-to-run thread in the ready thread queue is executed, allocates a free register file of the plurality of register files to the each ready-to-run thread, to load initial data for the each ready-to-run thread into the allocated register file, and the EU allocation and trigger unit, when there is a thread execution unit in idle state of the plurality of thread execution unit, retrieves ready-to-run thread from the top of the ready thread queue, and to allocate the retrieved ready-to-run thread to the thread execution unit in idle state, and to couple the register file loaded the initial data for the ready-to-run thread with the allocated thread execution unit in idle state, and to trigger the ready-to-run thread. The plurality of thread execution units execute the triggered threads concurrently in parallel.

9 Claims, 18 Drawing Sheets

FIG. 4
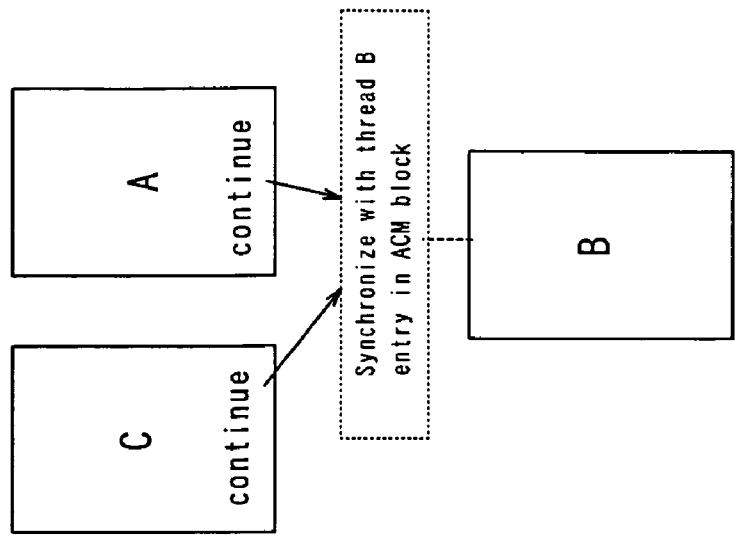
(3) (unlabeled)
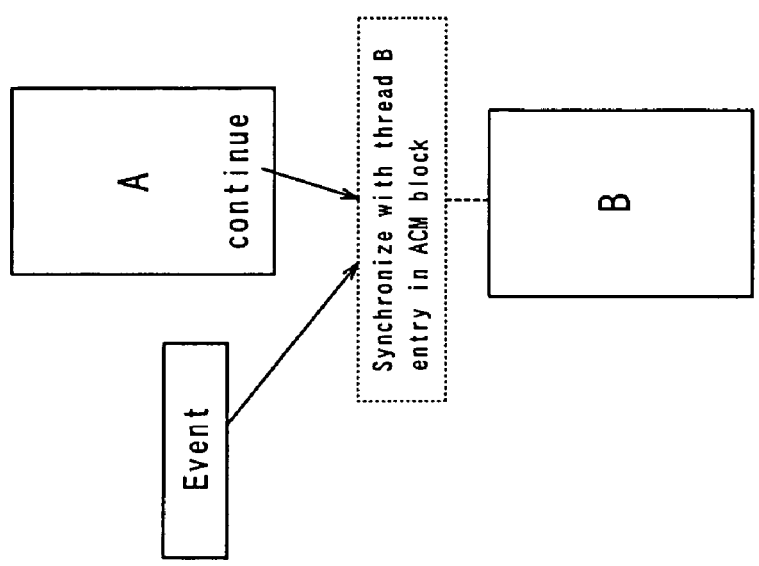
(2) Fan-in ≧ 2
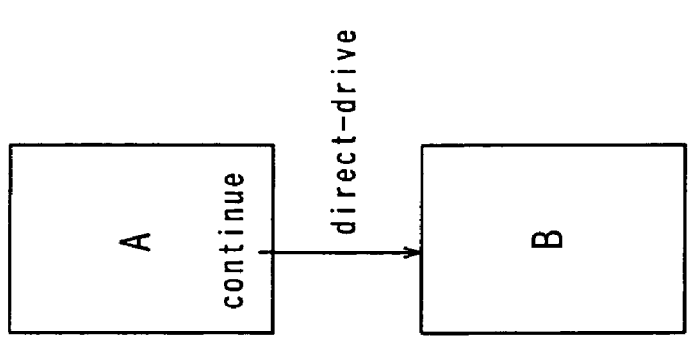
(1) Fan-in = 1

FIG. 7A (1) Direct-Continue Instruction

Instruction : Direct-continue next-thread,param
next-thread : Instance + thread-name to continue
param : pointer to entry of data area where
the parameter data are held

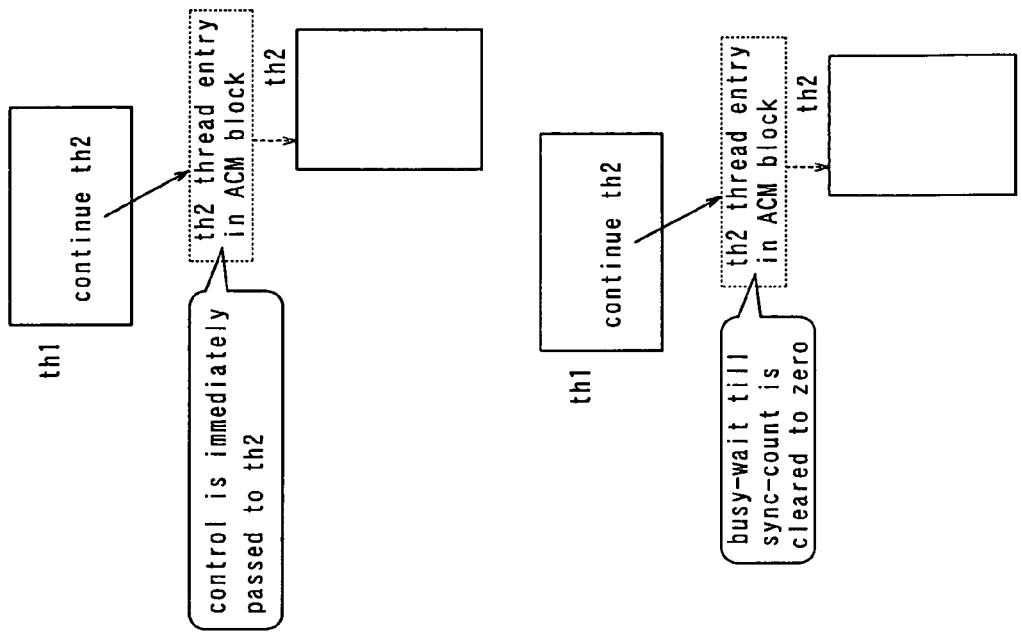

(2) Continue Instruction

Instruction : Continue next-thread,param
next-thread : [instance + thread-name to continue]
param : pointer to entry of data area where
the parameter data are held

FIG. 7B

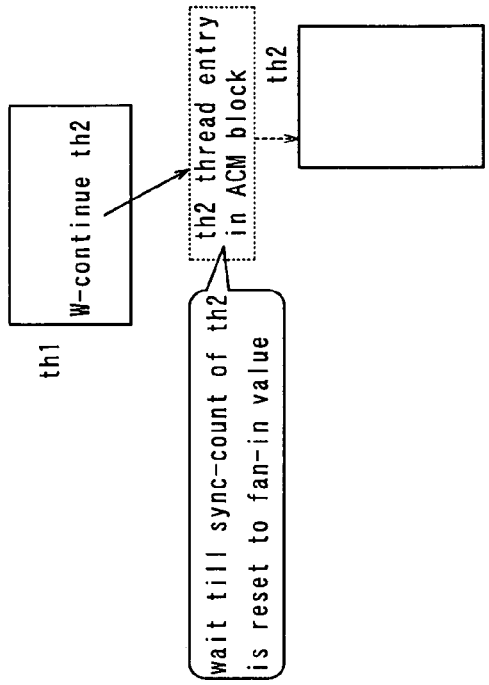
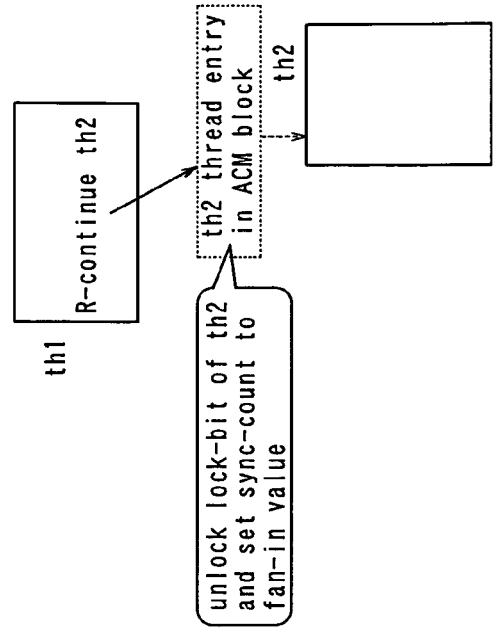

(3) Wait-and-Continue Instruction
Instruction : W-continue next-thread,param
next-thread : Instance + thread-name to continue
param : pointer to entry of data area where
the parameter data are held (4) Reset-and-Continue Instruction
Instruction : Reset-and-continue next-thread,param
next-thread : Instance + thread-name to continue
param : pointer to entry of data area where
the parameter data are held Data area Parameter Passing Macro Instruction :

Call func, param, curins, cont, retval func : [callee instance + callee function name]

param : parameter slot address curins : caller instance cont : caller side continuation thread retval : pointer to caller side return value receive slot

FIG. 10
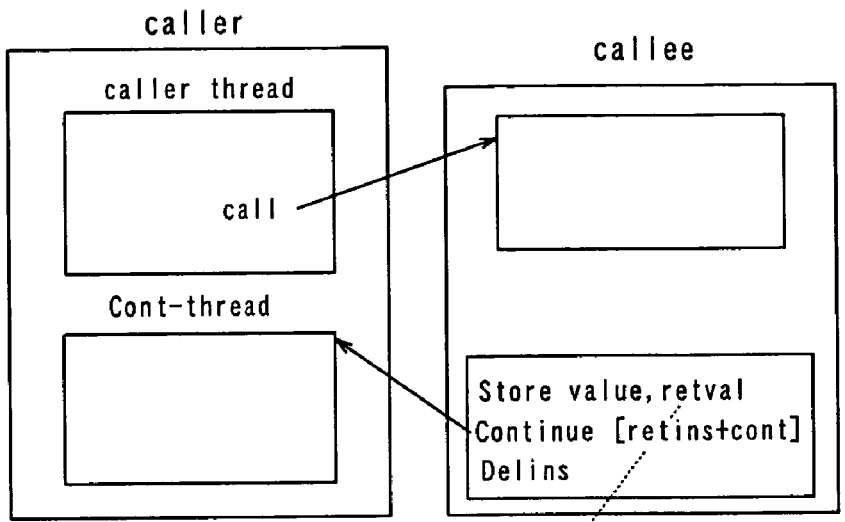
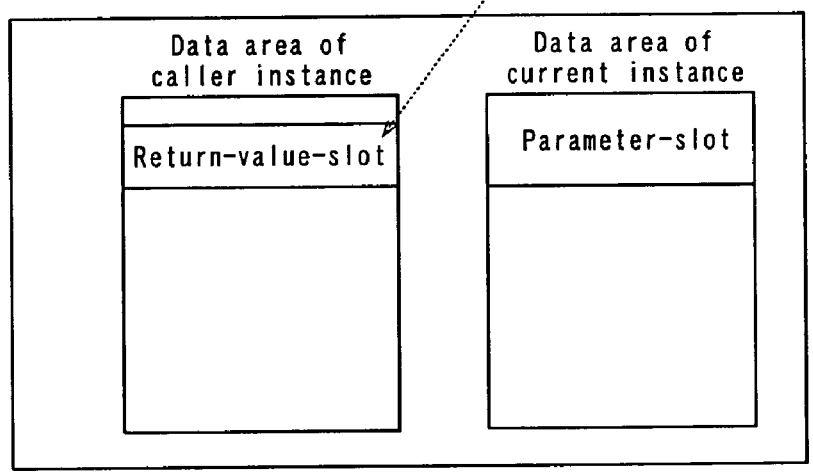
Data area
Return Value Passing
Macro Instruction :
    Return retins, cont-thread, retval
        retins : caller instance
        cont-thread : return thread
        retval : return value slot

FIG. 12
(a) Execution of Delegation
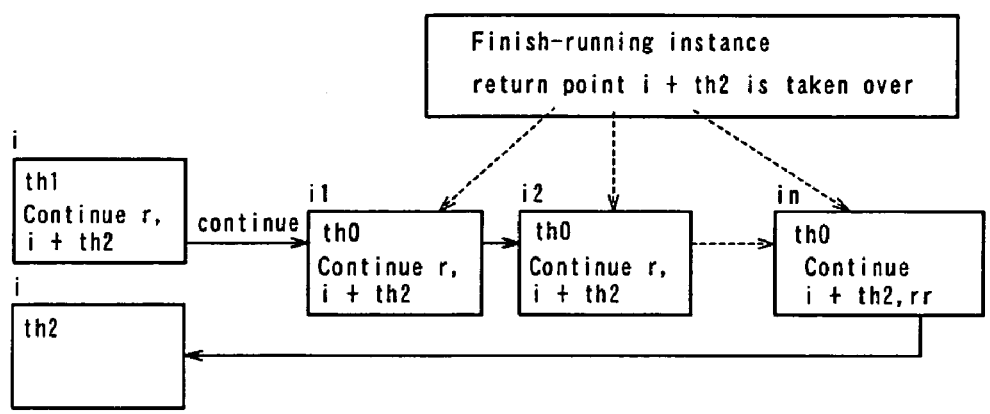
(b) Execution of Loop
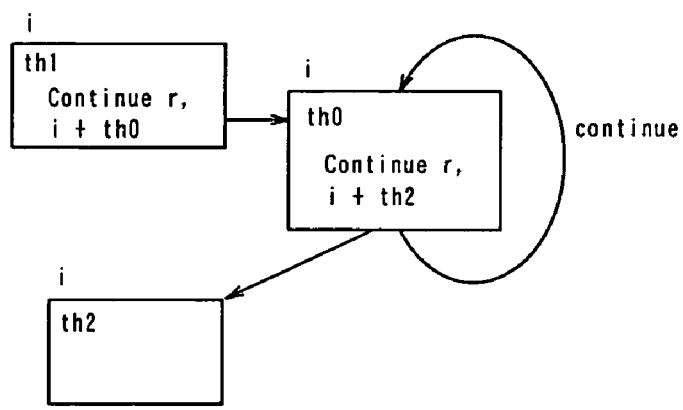

FIG. 14

(1) Test-and-lock instruction

Instruction : Test-and-lock next-thread next-thread : [instance + thread-name to continue]

(Alternate method)

Instruction : Test-and-lock r,next-thread next-thread : [instance + thread-name to continue]

r : register (2) Unlock instruction

Instruction : Unlock thread thread : [instance + thread-name]

(c) Third Exclusive Method
(Wait-and-Continue, Reset-and-Continue,
Test-and-lock, Reset-and-Continue)

PARALLEL PROCESSING COMPUTER

BACKGROUND OF THE INVENTION

1. Field of the Invention

The present invention relates to a parallel processing computer, and more particular to a parallel processing computer for executing a plurality of threads concurrently and in parallel.

2. Related Art Statements

In conventional on-chip multi-threaded processors, such processors are based on serial processing in a von Neumann type. In such a circumstance even if the processor is multi-processor having a plurality of processors, in order to asynchronously execute a plurality of internal processes, a plurality of external interruptions or events, in which number of interruptions or events is greater than number of processor resources, changing the execution environment of each processor by interrupting (i.e., preempting the control from a current running program) execution of the running program at the moment occurs frequently. This execution environment typically corresponds to control blocks such as the process control blocks (PCBs) which were generated for every process. Such control blocks are stored in the memory and are loaded in an extremely high-speed memory such as a register in the execution time. The control blocks include a lot of information such as values of respective registers, which should be used in each process, addresses at which instructions should be restarted, memory administrative information and input/output related information. It is therefore difficult to keep at a high operating rate of the processor, because the above-mentioned control mechanism becomes complicated and has larger overheads. In addition, the configuration of the program, which defines asynchronous parallel processing, becomes complicated, and in general it is difficult to program software codes for effectively achieving parallel processing.

There have been developed various multi-thread execution methods to make execution of a plurality of threads concurrently. Among them, a multiprocessor with a plurality of threads intermingling execution (which is called Simultaneous Multithreading; SMT) method to make execution concurrently by intermingling a plurality of threads in the instruction level is proposed. The SMT method has an advantage of lower development cost because it can utilize a conventional superscalar processor construction technique. However, because the code of the thread in SMT is a conventional general code and the thread is not a "nonstop (non-interruptive) exclusive execution" type thread provided by the present invention and there is no mechanism to avoid execution interruption in the thread, the execution interruption occurs generally. If as a latency, i.e., a waiting time occurs in any I/O process or any memory access during execution of the thread and thus an execution of an instruction, which follows the preceding instruction in wait sate, is delayed, the execution of the thread is interrupted in general. As for the thread which was interrupted in the execution, the execution is restarted (i.e., resumed) when a processor resource(s) becomes free. When such execution stopping or interruption arises, it is required to evacuate the execution state of the interrupted thread, and is required for the processing to recover the execution condition of the thread, which should be resumed in the execution. In principle, a problem regarding an execution environment change among threads is still remained in this prior technique in the same manner as the above-mentioned Neumann style computer.

Since the execution stopping or interruption is performed toward a thread which made a processor in an idle state due to memory access or communication with outside etc., such thread cannot expect when the execution of the thread is interrupted, that is, the thread being interrupted is blindsided by the interruption. Therefore, it is not possible to expect about the thread switch. It is a work of a scheduler (i.e., a dispatcher), which allocates a ready-to-run thread to a processor of the idle state and the detection of the idle state depends on a hardware mechanism.

Furthermore, various interruption-handling technologies for increasing in efficiency of the interruption processing in a conventional computer have been disclosed. For example, an interruption handling technology by Amamiya et al. who is the inventor of the present invention has been disclosed (refer to a Japanese patent document: Patent application laid open No. 2002-342093 (paragraphs 0006-0008, FIG. 1). This prior art is a technique, which preserves interruptions until reaching predetermined interruption number and when reaching the number the reserved interruptions are processed entirely. Although such interruption handling technique has an advantage in which existing program codes as they are can be operated due to its structure, this prior technique has some disadvantages such that an interruption processing with high-priority is forced to wait to some degree, and a hardware structure becomes complicated.

There are following problems regarding thread switch because as mentioned above conventional computers are not able to avoid change or switch processor environments when an execution interruption occurs, and thus it is difficult to keep the operating rate or performance of the processor high.

(i) Because it is not possible to expect when the execution interception occurs, that is, program code itself cannot estimates when the control of the processor is preempted, all information regarding current executing environment must be sheltered or evacuated and thus the evacuation and recovery must treat extra data.

(ii) Because an arithmetic (execution) unit is fixed or immobilized to a register, the register, which is used by the thread in execution cannot be utilized by other threads until the execution interruption or stopping occurs. In other words, it is impossible to change the execution environment in advance because it is not possible to expect.

SUMMARY OF THE INVENTION

It is an object of the present invention to provide a parallel processing computer for executing a plurality of threads concurrently and in parallel. In order to solve the above-mentioned problems, there is provided a parallel processing computer for executing a plurality of threads concurrently and in parallel, and said computer comprises:

a thread activation controller (which is called TAC) for determining whether or not each of threads, which are exclusively executable program fragments (that is, each program fragment is a program code such that when once the code commences the fragment able to finish running without losing a control of the processor for interruption handling or without waiting for processes by other threads till the last), which is ready-to-run, and to put the thread (i.e., enqueuing the thread) determined which is ready-to-run into a ready thread queue as ready-to-run thread; and a thread execution controller (which is called TEC) having a pre-load unit, an EU allocation and trigger unit, a plurality of thread execution units and a plurality of register files including a plurality of registers, and wherein the pre-load unit, prior to when each ready-to-run thread in the ready thread queue is executed (more preferably, when that thread is located at either the beginning or its vicinity of the queue), allocates a free register file of the plurality of register files to the each ready-to-run thread, and to load initial data for the each ready-to-run thread into the allocated register file, and wherein the EU allocation and trigger unit, when there is a thread execution unit in idle state of the plurality of thread execution units, retrieves ready-to-run thread from the top of the ready thread queue, and to allocate the retrieved ready-to-run thread to the thread execution unit in idle state, and to couple the register file loaded the initial data (i.e., execution environment or data needed for executing from the beginning to end of the thread without interruption or discontinuation) for the ready-to-run thread with the allocated thread execution unit in idle state, and to activate or trigger the ready-to-run thread, and wherein the plurality of thread execution units execute the activated or triggered threads concurrently in parallel.

According to the present invention, when once each thread attains the control of the execution unit and starts its execution, the thread carries execution through to the end without loosing the control or without any interruption. For this reason, the loads or overheads of the execution environment change do not arise at all on the way and thus the throughput as the whole computer improves remarkably. In other words, in order to allow each thread to be executable exclusively, each execution unit is provided with a register file which has high-capacity and can be accessed at high speed. In this configuration, because all data needed for executing that thread is stored in registers and only the stored data in the register is used in thread execution time, it is possible to avoid I/O waiting or memory access involving switch of execution environments.

In a preferable embodiment of the parallel processing computer according to the present invention, the plurality of thread execution units are coupled to instruction caches, each of which is dedicated to each thread execution unit, respectively, and wherein the parallel processing computer further comprises a first memory manager, said first memory manager, before ready-to-run thread is triggered, loading the code of the ready-to-run thread into the instruction cache from the memory.

According to this embodiment of the present invention, because instruction codes are always loaded into caches prior to activating a ready-to-run thread, the time for taking out instruction codes from the memory can be saved and thus it becomes possible to further improve the processing speed of the whole computer, i.e. a throughput.

In another embodiment of the parallel processing computer to the present invention, said parallel processing computer comprises data caches, the pre-load unit accesses the data caches before accessing to the memory, and if data for executing is found in any data cache the pre-load unit loads the found data for execution from the any data cache.

According to this embodiment of the present invention, the facilitation of the processing of the pre-load unit can be achieved and the processing speed of the whole computer, i.e. the throughput becomes able to be more improved due to setting up a data caches.

In a still another embodiment of the parallel processing computer to the present invention, the data caches include a plurality of memory banks, and wherein the parallel processing computer further comprises a second memory manager, and wherein the second memory manager, when executing each thread if there is any memory bank of the data cache which was used by the thread which precedes the each thread, is controlled to use the any memory bank.

According to this embodiment, it is possible to access to the data cache which reflects the locality of the execution and thus, finally, the processing speed of the whole computer, i.e. the throughput can be more improved.

In a still another embodiment of the parallel processing computer to the present invention, the thread activation controller comprises synchronous control memory, and wherein the synchronous control memory has blocks for every instance, each block having both a count field for synchronously activating thread and a preceding-thread number field (which referred to as "fan-in" hereinafter) in which preceding thread number is previously stored therein for each thread, and wherein the thread activation controller sets preceding thread number, which is set in the preceding-thread number field as an initial value, in the count field, to decrement the value in the count field by one when each activation notice is received, and to determine that the thread is ready-to-run if the value reaches zero.

According to this embodiment, it is possible to simply and efficiently control thread execution serialization and thus, finally, the processing speed of the whole computer, i.e. the throughput can be more improved.

In a still another embodiment of the parallel processing computer to the present invention, each block of the synchronous control memory further has a lock flag, and the plurality of thread executing unit supports both a lock instruction for locking the lock flag and a unlock instruction for unlocking the lock flag.

According to this embodiment, it is possible to control exclusion continuation to each thread using a Test-and-lock instruction and Unlock instruction, which will be describe in detail later, to simply and efficiently perform exclusive control and thus, finally, the processing speed of the whole computer, i.e. the throughput can be more improved.

In a still another embodiment of the parallel processing computer to the present invention, said parallel processing computer further comprises:

at least one exclusive control thread capable of accessing at least one shared resource;

an exclusion continuation controlling mechanism for controlling exclusion continuation to the at lest one exclusive control thread; and an exclusion access control means for controlling exclusion access to the at least one shared resource.

According to this embodiment, it is possible to simply and efficiently perform exclusive access to shared resources involving processing of outside events or I/O accesses and thus, finally, the processing speed of the whole computer, i.e. the throughput can be more improved.

The present invention provides is a parallel processing computing architectures including the steps of subdividing a conventional process into exclusive executable program fragments, which is called thread, and parallel processing by making run a plurality of threads at the same time and in parallel. The present architecture is implemented in one-chip processor, which controls execution synchronization among threads using a continuation concept and exploits thread level parallelism. In the present invention, all internal data processing and all outside event processing such as interruptions are unified in thread level and it is possible to achieve the asynchronous parallel execution of the thread level.

The present invention relates to a technique, which solves the problems included in the conventional on-chip multiprocessor described above, and keeps the operating rate of the processor high, and moreover realizes on-chip computer, which performs unified process to the internal data processing and external interruptions therein.

In the technique of the present invention, the thread is defined as program fragment to finish running without receiving interference from the others. One program is composed of a plurality of threads. An order (the partial order) relation of the execution is given among the threads and the execution of the thread is controlled according to this order. A thread, which is executed after a certain thread, is called "continuation thread" of that thread. Also, a thread, which is executed prior to a certain thread, is called the "preceding thread." The number of the preceding threads is called fan-in and the number of the continuation threads is called fan-out. When a continuation thread is tried to be activated at the time of an execution ending (or during execution) of a certain thread, activation or start-up notices are issued to the continuation threads (the number of the start-up notices corresponds to the value of fan-out). A certain thread execution becomes possible when receiving activation notices from the all preceding threads (i.e., when receiving "n" activation notices, n is equivalent to the value of fan-in). Because execution order among the threads is a partial order, there can exist a plurality of ready-to-run threads, each of which gets to receive activation notices from the all preceding threads. Therefore, if there are sufficient number of processing units, a plurality of ready-to-run threads can be executed concurrently or at the same time and in parallel, this is called multi-thread execution herein.

An external interruption handling program, a communication-processing program, and all OS kernel programs in addition to programs coded by end users are given as respective thread aggregates (which is called "multi-thread"). A program, which is written in a high level language is divided into threads by a compiler and to be given as the aggregate of the thread (which is called a multi-thread). The parallel processing computer (hereinafter, which may be called "processor") of this invention has a plurality of thread execution units and a plurality of register files and executes a program, which is given as the thread aggregate in a multi-thread environment. Each of thread execution units is allocated to each of free or ready-to-run threads and the each of ready-to-run threads is processed exclusively without receiving disturbing from the others. In case of thread execution, memory accesses do not occur and the processing is carried out only with accesses to registers. Accordingly, the thread can be exclusively executed at high speed. Initial data (i.e., execution environment, which is necessary to execute the thread) is read from the memory into a register to be used by the thread before execution of the thread. Pieces of information to be carried out into continuation thread (execution environment) are written in a memory immediately before issuing an activation notice to the continuation thread.

The present processor has the activation control unit (TAC: Thread Activation Control Unit) to check a executable condition (that is, to monitor whether or not the number of arrival of the start-up notices is equal to the value of fan-in) to each thread. The TAC has a high-speed activation control memory (ACM: Activation Control Memory), which maintains the number of the preceding threads, each of which does not have an activation notice yet. Also, the TAC has a ready-to-run thread queue (Ready Thread Queue) which maintains ready-to-run threads which satisfy the activation condition (i.e., the number of not-yet-received activation notices is equal to zero).

Also, the present processor has a load and store control unit (LSC: Load/Store Control Unit), which forwards data among the memory and registers independent with the operation of respective processing or execution unit. The LSC secures a free register file for a thread, which is moved to a part at the beginning of the ready thread queue and in which execution of that thread is imminent and loads the execution environment (initial data) for that thread.

Number of register files is greater than that of execution units (about 1.5, to 2.0 times). Also, each register file has more registers than that of a conventional processor. Because a thread execution is done accessing only to registers, the number of the steps of thread execution can be increased (i.e., a grain size can be high). In this multi-thread execution, if a certain execution unit finishes a thread execution, the certain execution unit is immediately allocated to a new ready-to-run thread and the same time the certain execution unit is also allocated to a register file in which execution environment has been satisfied, and thus the certain thread is instantly executed. Therefore, the degree of capacity utilization of the execution unit can be kept high.

The features or configuration of the parallel processing computer (i.e., processor) of the present invention are summarized as follows:

(1) Using the execution continuation concept with respect to execution synchronization among the threads, all internal data processing and all outside event processing such as interruptions are unified in thread level and thus the asynchronous parallel execution of the thread level is performed.

(2) The present computer has a plurality of thread execution units and a plurality of high capacity register files, and a plurality of threads are executed simultaneously and in parallel.

(3) Scheduled or dispatched thread (to which EU and register file are allocated) at thread execution occupies both a thread executing unit and a register file, the thread can finish running without stopping or interruption in midway. The thread execution unit processes the thread using only register and/or register file and does not access any memory during execution.

(4) When a thread is tried to be executed, a thread execution unit is dynamically combined with a large-volume register file and it releases the thread execution unit and a register file when the thread execution ends (that is allocating of a thread execution unit and a register file is semi-fixed).

(5) The present computer has a thread activation control unit which has the thread synchronous counter to control an execution sequence among the threads.

(6) The present computer has a queue which maintains the ready-to-run threads each of which is made that activation condition (synchronization) is satisfied. If there is a free thread execution unit which is released after the execution ends, the free thread execution unit is allocated or fixed to a ready-to-run thread in the queue.

(7) The present computer has a load/store unit, and when each ready-to-run thread in the ready thread queue is to be executed (for example, that thread is located at the beginning of the ready thread queue), a free register file selected from the plurality of register files is allocated to the ready-to-run thread prior to executing the thread, and to load an execution environment (initial data for the thread) in the register file. The information in the register file is transferred into the main memory after the execution ends.

(8) The present computer has an exclusion access control feature (critical region control function), which controls the exclusive accesses, which are involved with external interruption handling or the like, to shared resources.

(9) The present computer has an instruction cache and a data cache having a plurality of modules, and accessing to different instruction cache and data cache module are carried out by every thread execution environment. Accordingly, it is possible to make the access to the instruction cache and data cache in which a locality of the execution is reflected.

(10) The present computer having the above described features is implemented in One-chip.

BRIEF DESCRIPTION OF THE DRAWINGS

The present invention will now be described in more detail, by way of examples which in no way are meant to limit the scope of the invention, but, rather, these examples will serve to illustrate the invention with reference to the accompanying drawings, in which:

FIG. 4 is a diagram representing a mechanism of the control transfer to the continuation thread from the preceding thread in the parallel processing computer according to the present invention;

FIG. 7A is a diagram representing continue instruction functions which are supported by the parallel processing computer according to the present invention;

FIG. 7B is a diagram representing a continue instruction functions which are supported by the parallel processing computer according to the present invention;

FIG. 10 is a diagram representing an exemplary return control from the routine (function) of the parallel processing computer according to the present invention;

FIG. 12 is a diagram illustrating an exemplary delegation of control and an exemplary execution of loop of the parallel processing computer according to the present invention;

FIG. 14 is a diagram depicting an exemplary specification of the Test-and-lock instruction and Unlock instruction, which are supported by the parallel processing computer according to the present invention;

DETAILED DESCRIPTION OF THE PREFERRED EMBODIMENTS

Several preferred embodiments of the inventory management systems according to the present invention will be described with reference to the accompanying drawings.

Figure 1:
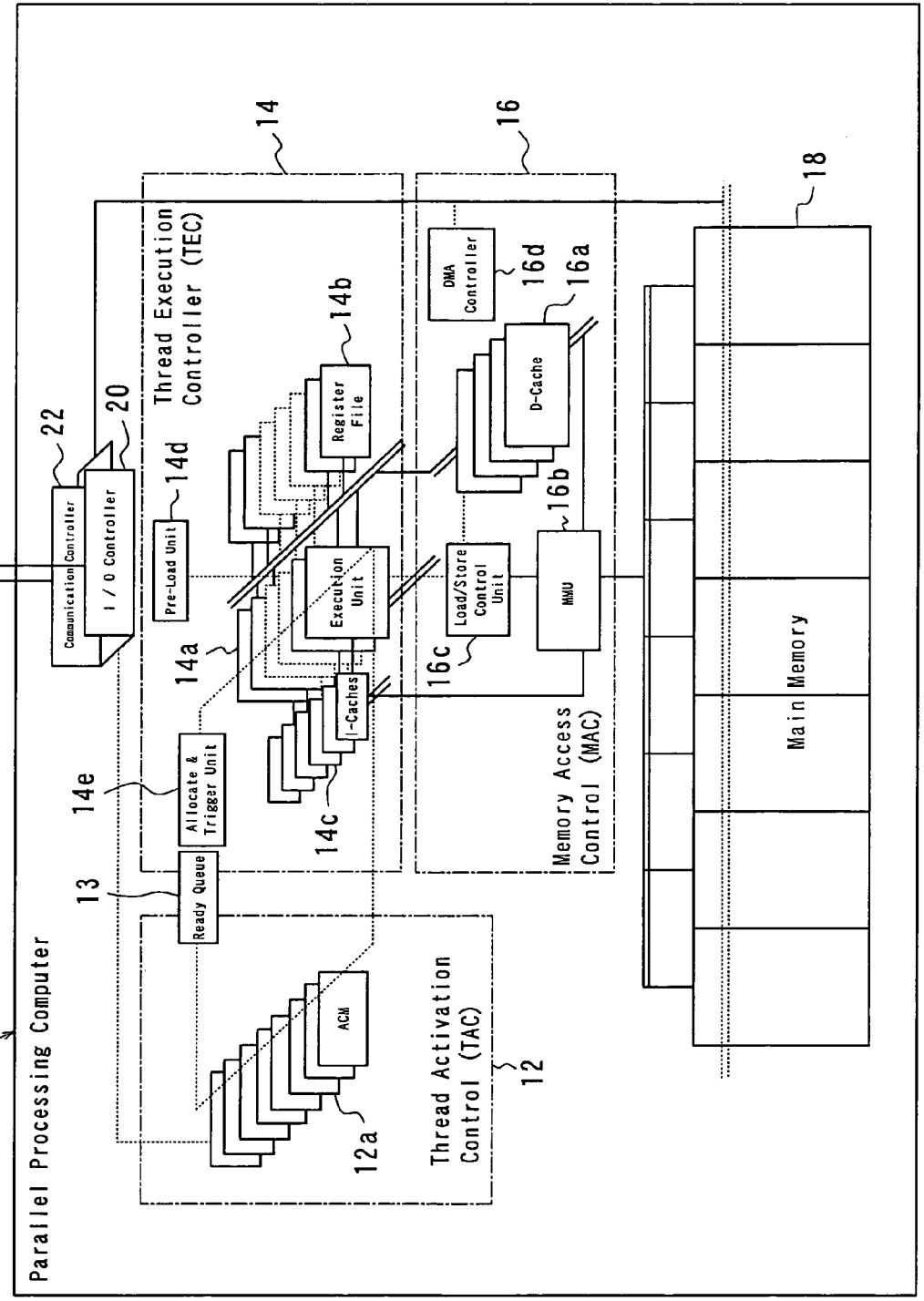
FIG. 1 is a block diagram illustrating a basic configuration of an embodiment of the parallel processing computer capable of executing fine-grained multi-thread according to the present invention.

FIG. 1 is a block diagram illustrating a basic configuration of an embodiment of the parallel processing computer capable of executing fine-grained multi-thread according to the present invention. A parallel processing computer 10 according to the present invention comprises a thread activation controller (TAC) 12, a thread controller (TEC) 14, a memory access controller (MAC) 16, and a main memory (MEM) 18, an I/O controller 20 and a communication controller 22. TAC 12 has the high speed storage activation control memories (ACMs) 12a of the synchronous administrative among the threads and controls the start-up or activation of the thread execution. The TEC14 has a plurality of thread execution units (EUs) 14a and a plurality of register files 14b and does each thread execution in parallel. The TAC 12 is connected to the TEC 14 via a ready-thread queue 13 and the TAC 12 places a thread code which becomes executable i.e., ready-to-run onto the end of the ready queue 13. The TEC 14 takes out the ready-to-run thread code which is at the beginning of the queue 13. Each EU 14a has each instruction cache (I-Cache) 14, which maintains the thread code which is being (or to be) executed. There are provided a plurality of data caches (D-Caches) having a plurality of banks and thus data access speed can be accelerated. The memory access controller 16 controls to read data from the memory 18 and to write it into register files 14b and also controls to transfer data from the register files 14b to the memory 18. In addition, the MAC 16 further includes a memory manager 16b, a load/store controller 16c and a DMA controller 16d.

The thread execution controller 14 includes a pre-load unit 14d and the pre-load unit 14d controls to read data and to stores into a free register (or a free register file) before a ready-to-run thread code in the ready queue 13 is executed. The thread execution controller 14 further includes an EU allocating and trigger unit 14e, which will be explained in detail later.

Figure 2:
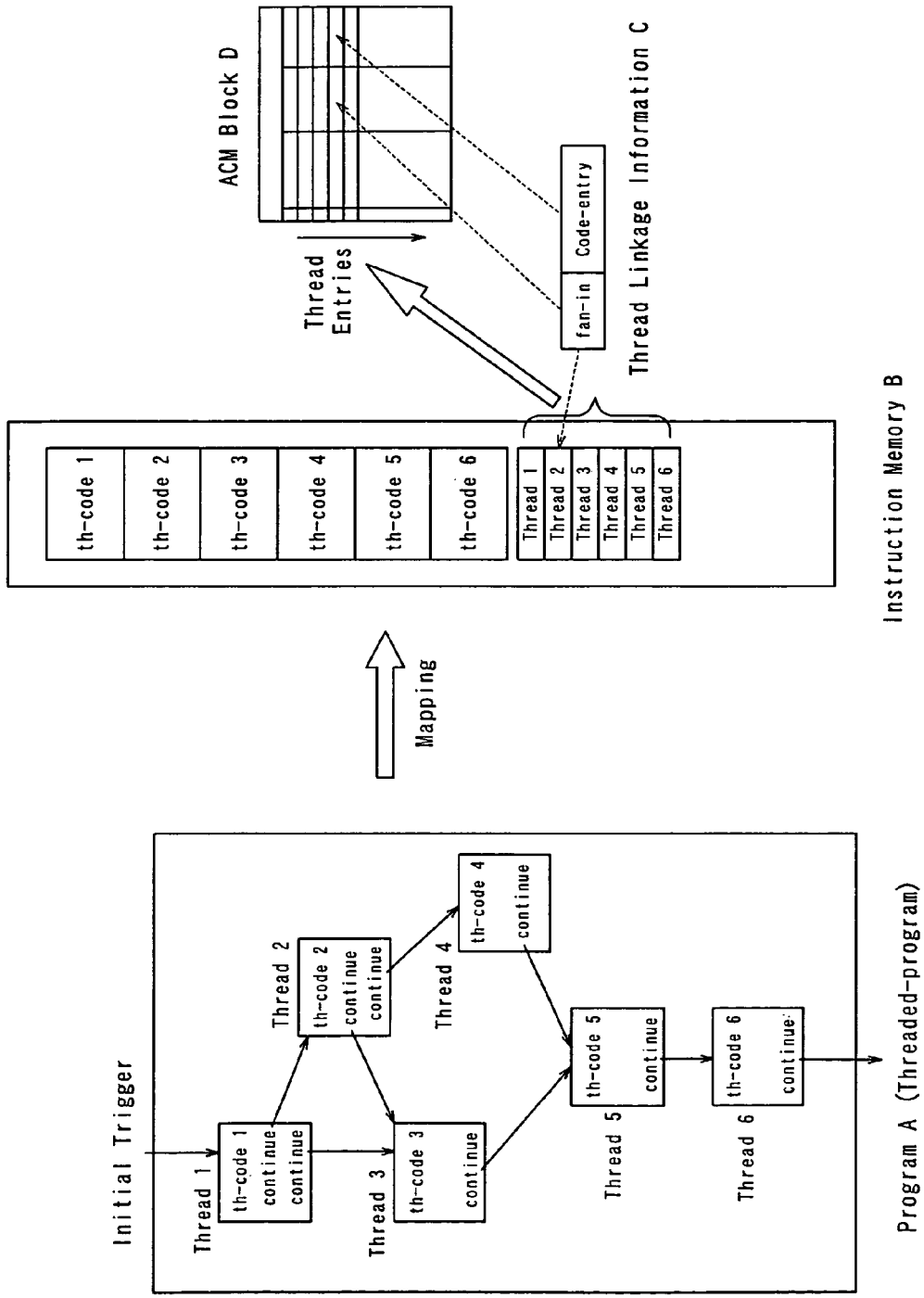
FIG. 2 is a diagram depicting an example of the multi-thread program structure.

FIG. 2 is a diagram depicting an example of the multi-thread program structure. An existing program code is translated into the structure as shown FIG. 2 by a language process system (e.g., a compiler or the like) and the translated program is called a thread (Threaded-program). The thread program is loaded into a memory by a program loader. Embodiments of the parallel computer according to the present invention are based on the premise of such environment. As shown in FIG. 2, program A is an example of the thread program which consists of six thread codes: Thread 1, Thread 2, . . . Thread 6. This program is started up from a thread program instance during execution (At this moment, firstly an instance for execution of this thread program is generated, and the instance will be described in detail later) and then Thread 1 is executed. When a continue instruction in Thread 1 is executed during execution of Thread 1, start-up or activation signals are transferred to Thread 1, Thread 2 and Thread 3 . In this example illustrated in FIG. 2, Thread 2 is executed at once without waiting for a start-up signal from the others because the Fan-in value of Thread 2 is one. A continue instruction is executed during execution of Thread 2 and then activation signals are transferred to Thread 3 and Thread 4. Execution of Thread 3 is started by the arrival of the activation signals from both Thread 1 and Thread3 (i.e., synchronization is taken) because the Fan-in value of Thread 3 is two. In a similar way Thread 4 and Thread 5 are processed or executed. Finally, Thread 6 issues a continue instruction to a certain thread program during execution of Thread 6 and then computation is taken over to the certain thread program (i.e., a certain instance of the program). When the execution of Thread 6 finishes, the execution instance of this thread program quits and this instance disappears. Here, it is noted that thread activation is controlled by the activation signal and threads are executed in parallel.

The Program A is expanded and mapped into an instruction memory B, respective thread codes of the thread and thread linkage information C (which includes a relationship between a preceding thread(s) and continuation thread(s), Fan-in value, entry-address of thread code) among the thread codes are separately disposed in the instruction memory as shown in FIG. 2. When a n instance of program A (Threaded-Program) is to be started, each thread linkage information is loaded into a thread-entry field, which corresponds to the instance, in the ACM (Activation control memory) block D. Namely, thread linkage information C is set from top down into each thread-entry field D.

Figure 3:
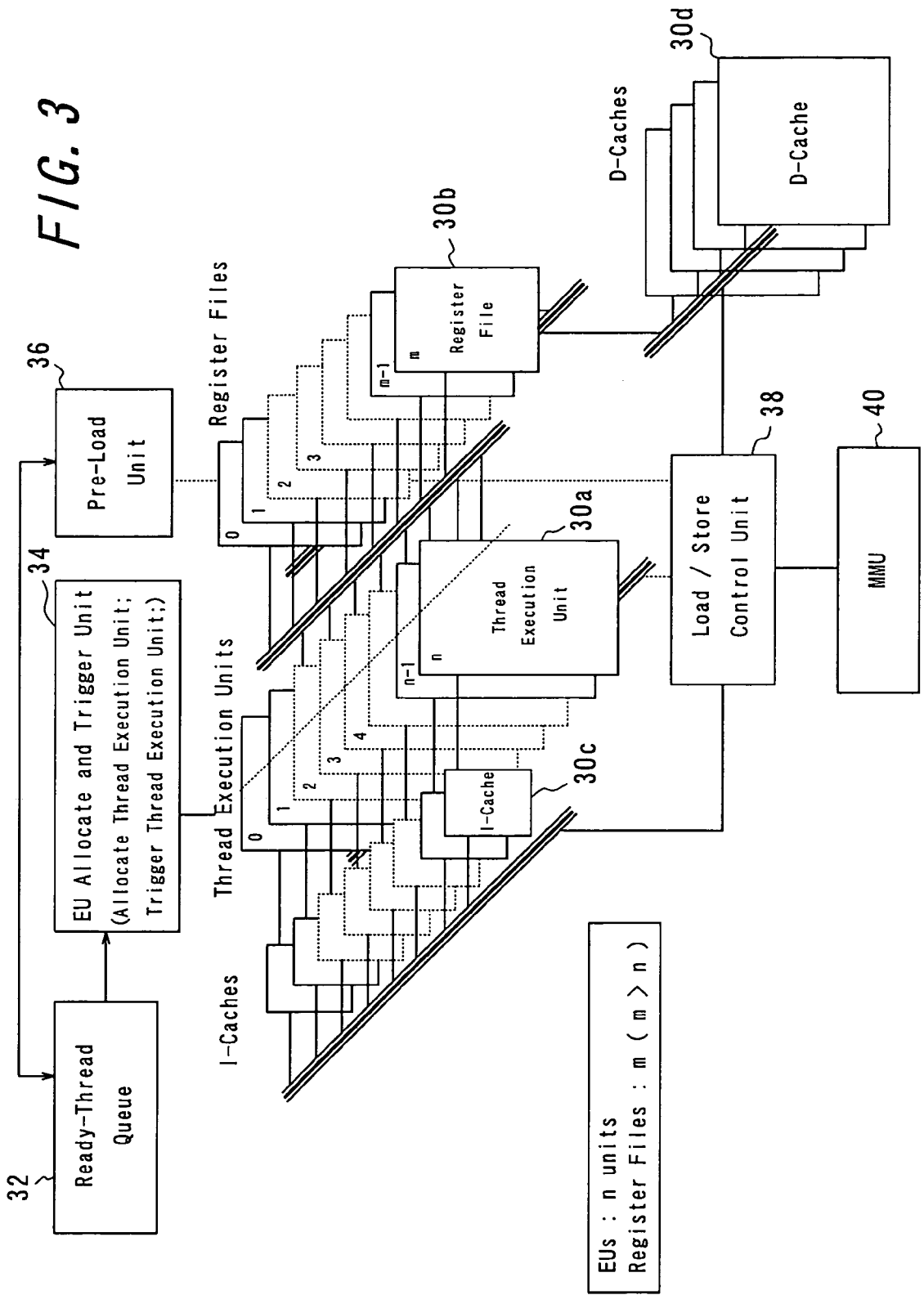
FIG. 3 a block diagram showing a multi-thread execution controller (TEC) and a memory access controller (MAC) of an embodiment of the parallel processing computer according to the present invention.

FIG. 3 is a block diagram showing a multi-thread execution controller (TEC) and a memory access controller (MAC) of an embodiment of the parallel processing computer according to the present invention. The TEC includes "n" thread execution units (EUs) 30a and "m" register files 30b, where it is satisfied that m is greater than n (e.g., m/n=1.5-2). The TEC further includes instruction caches (I-Caches) 30c and data caches (D-Caches) 30d. An I-Cache is provided with every EU and a D-Cache has a plurality of units. The executable thread codes (i.e., entry addresses specifically) are connected (i.e., enqueued in) to a ready-thread queue 32. Hereinafter, an executable thread is called a ready-to-run thread. It takes out a thread from the head of queue 32 when some of the EU becomes idle, and the EU allocating and trigger unit 34 retrieves a thread from the top of the ready-thread queue 32 if there is a free EU among them (that is in idle state), and then allocates an EU 30a in idle state with this thread and activates it.

When the register file 30b being used is released after the EU30a finishes the thread execution, the pre-load unit 36 loads an execution environment corresponding to a ready-to-run thread which is being closed to the beginning of the ready-thread queue 32 into the released register file 30b in order to prepares for the execution of the thread to be able to begin anytime.

Due to this preceding load operation, when an EU in idle state arises, the idle EU can immediately be allocated to an ready-to-run thread at the top or beginning in the queue 32, and to start the execution of that ready-to-run thread.

When the pre-load unit tries to load data before execution of the thread and to store data during execution of the thread, data-cache 30d is accessed before directly reading and writing from and to the memory (this is the same as the conventional data cache access control in case of reading and writing from and to a memory.). As for the access to instruction cache (I-cache) 30c, the code of the ready-to-run thread is loaded from the memory into the I-cache, and after that, the reading of the instruction code is read out from the I-cache 30c during the thread execution. The load/store control unit 38 (Load/Store Controller) allows the memory management unit (MMU) 40 to control the access to the data cache 30d, the instruction cache 30c and the memory.

FIG. 4 is a diagram representing a mechanism of the control transfer to the continuation thread from the preceding thread in the parallel processing computer according to the present invention.

As shown in FIG. 4, there are the following two cases in the control transfer to a continuation thread from a preceding thread.

(1) When Fan-In of the Continuation Thread is One (Fan-In=1)

In this embodiment when a continuation instruction (i.e., continue) is executed in the preceding thread A and a start-up signal to the continuation thread B is issued, the control directly shifts to the continuation thread B without going through an ACM. Specifically, A code entry pointer index of the continuation thread B is disposed into the ready-thread queue.

(2) When Fan-In of the Continuation Thread is Equal to or More than Two (Fan-In≧2)

It is noted that in this figure, it is shown about the case that Fan-in is two but it is the same in case of equal to or more than 3. In this embodiment threads are synchronized using information in ACM blocks. As shown in FIG. 4, when activation signals are obtained by thread B due to both executing continue instruction in thread A and an event from outside, the activation condition (synchronization) of thread B is satisfied and then thread B becomes to be activated. In addition, the activation condition is checked by the thread activation controller (TAC).

Figure 5:
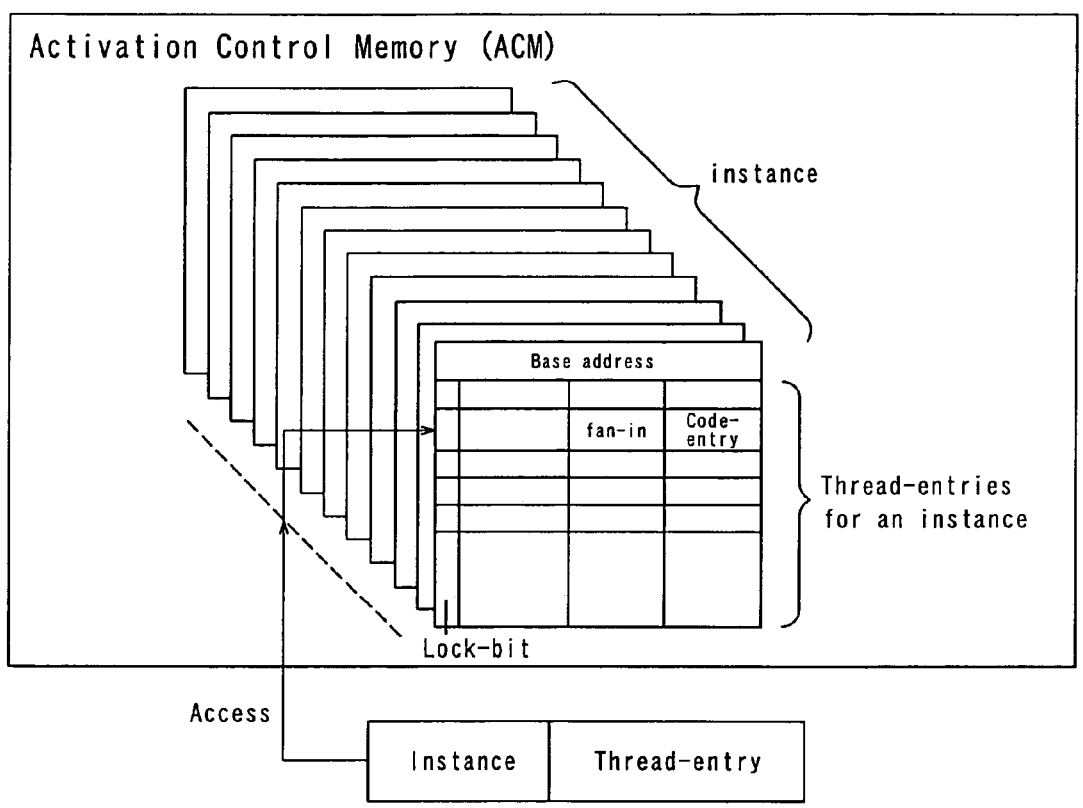
FIG. 5 is a memory map illustrating an exemplary configuration of the ACM of the parallel processing computer according to the present invention.

Synchronous control memory (ACM) is provided in the TAC. FIG. 5 is a memory map illustrating an exemplary configuration of the ACM of the parallel processing computer according to the present invention. An ACM is composed of a lot of blocks. An ACM block is allocated to an instance when the instance is generated described above, and it is released when the execution of the instance ends. When an instance is allocated, a link information (entry addresses and Fan-in values of a thread code) of each thread code in the thread program of the instance execution is loaded into an ACM block as the original value. This allocation technique is similar to a dynamic allocation management technique in conventional page allocation technique as well known in the art.

Access to an ACM block is performed using [instance+thread entry]. Here, [instance+thread entry] represents a value consisting of both an instance number as a high field and a thread number as a low field, and an instance number denotes an address at the header of the ACM block and a thread number denotes a local entry address in the ACM block. Thread entry in the ACM is given as a local address in the ACM block, which corresponds to the thread number. It is noted that a thread number is already decided when generating a concerned thread program in the compile time. Each thread entry is includes a lock bit field (i.e., flag for the lock) for exclusive control, a synchronous count field (Sync-count), a fan-in value field for the thread start-up, a thread code entry field (Code-entry). In addition, base address at the top of each ACM block is used as a base address for virtual memory management and maintains an address (i.e., physical address) of the head of the data area of the concerned instance at execution time.

Figure 6:
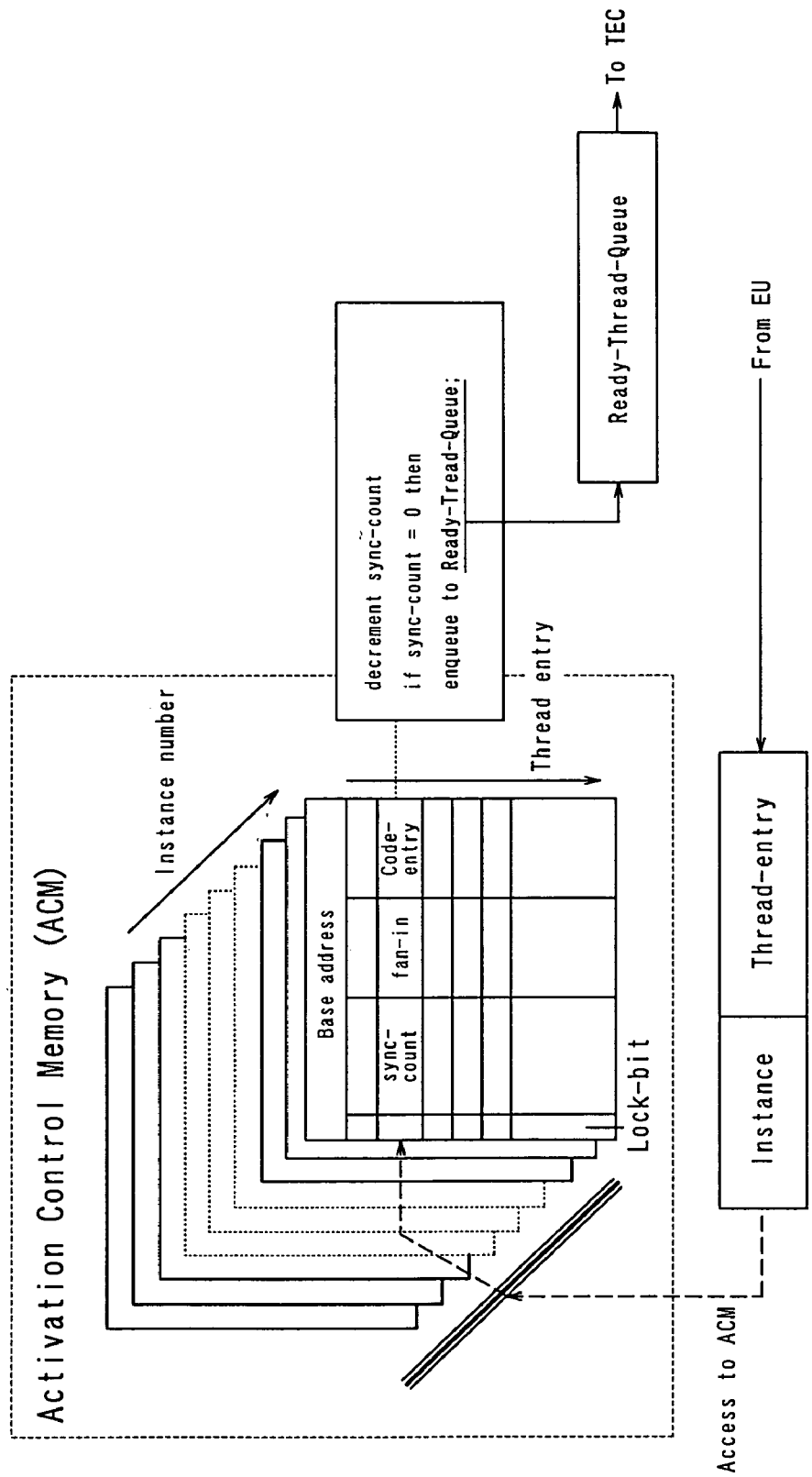
FIG. 6 is a diagram depicting an exemplary operation of TAC of the parallel processing computer according to the present invention.

FIG. 6 is a diagram depicting an exemplary operation of TAC of the parallel processing computer according to the present invention. Synchronous count is set to fan-in value (i.e., number of the preceding threads) as an original value, and a synchronous count is decremented by one every time the start-up signal of concerned thread arrives. If a synchronous count become equal to zero (sync-count=0) when it is decremented, the start-up condition of the thread is satisfied and then this thread is enqueued into ready queue (Ready-Thread-Queue) as an executable or ready-to-run thread. An activation signal is issued to the thread when a continue instruction is issued during execution of the thread itself or other threads. At this moment, continuation thread number which is given as an operand of the continue instruction and number of instance being in execution [Instance+Thread entry] are issued from the EU to the TAC. The instance number may be the number of other thread. When a number of a certain thread other than that thread is specified, the process is passed to the certain thread. On receiving this information, the TAC accesses to a concerned thread entry in the ACM block using the [Instance+Thread entry], and to decrement the sync-count in the thread entry by one. Additionally, when continuing to the thread itself, it may be required that a concerned thread is executed in the exclusive control, if so, the exclusive control is performed using the lock bit and/or Reset-and-Continue instruction, which will be described in detail later.

FIG. 7A is a diagram representing continue instruction functions which are supported by the parallel processing computer according to the present invention.

(1) Direct-Continue Instruction

This instruction is used when Fan-in of the continuation thread is 1.

In the execution of this instruction, the thread entry in the ACM block corresponding to the continuation thread is directly enqueued in the ready-thread queue without changing the sync-count value. Alternatively, the code entry of the continuation thread is directly embedded in the operand of Direct-Continue instruction in advance, the thread is enqueued in the ready-to-run thread queue without accessing an ACM block (this case is shown in FIG. 4).

(2) Continue Instruction

This instruction is used when Fan-in value is equal to or more than two, that is, control is passed to a typical continuation thread having at least two preceding threads or the like. The operation steps of this instruction are as follows:
1. A synchronous count of the thread entry in the ACM block corresponding continuation thread is decremented by one.
2. If the synchronous count is equal to zero, a next thread (i.e., code entry pointer thereof) is enqueued into the ready thread queue in the thread code entry.

FIG. 7B is a diagram representing continue instruction functions which are supported by the parallel processing computer according to the present invention.

(3) Wait-and-Continue Instruction

This instruction is used for the management of critical area (Critical Region) and semaphore with the exclusive control and so on (the exclusive control will be described in detail later). The operation steps of this instruction are as follows:

1. If sync-count of the thread entry in the ACM block corresponding the continuation thread is equal to zero, the process is forced to wait till sync-count is reset to fun-in value, that is, forced to be busy-wait state.
2. Synchronous count is decremented by one.
3. If the synchronous count is equal to zero (sync-count=o), the next thread code entry is enqueued into the ready-thread queue.

(4) Reset-and-Continue Instruction

This instruction is also used for the management of critical area (Critical Region) and semaphore (the exclusive control will be described in detail later). The operation steps of this instruction are as follows:
1. A lock-bit of the thread entry in the ACM block corresponding to a continuation thread is set to "off" (i.e., unlocked), and then a synchronous count value is set to the fan-in value.
2. Synchronous count of the continuation thread is decremented by one.
3. If the synchronous count is equal to zero (sync-count=o), the next thread code entry is enqueued into the ready-thread queue.

Figure 8:
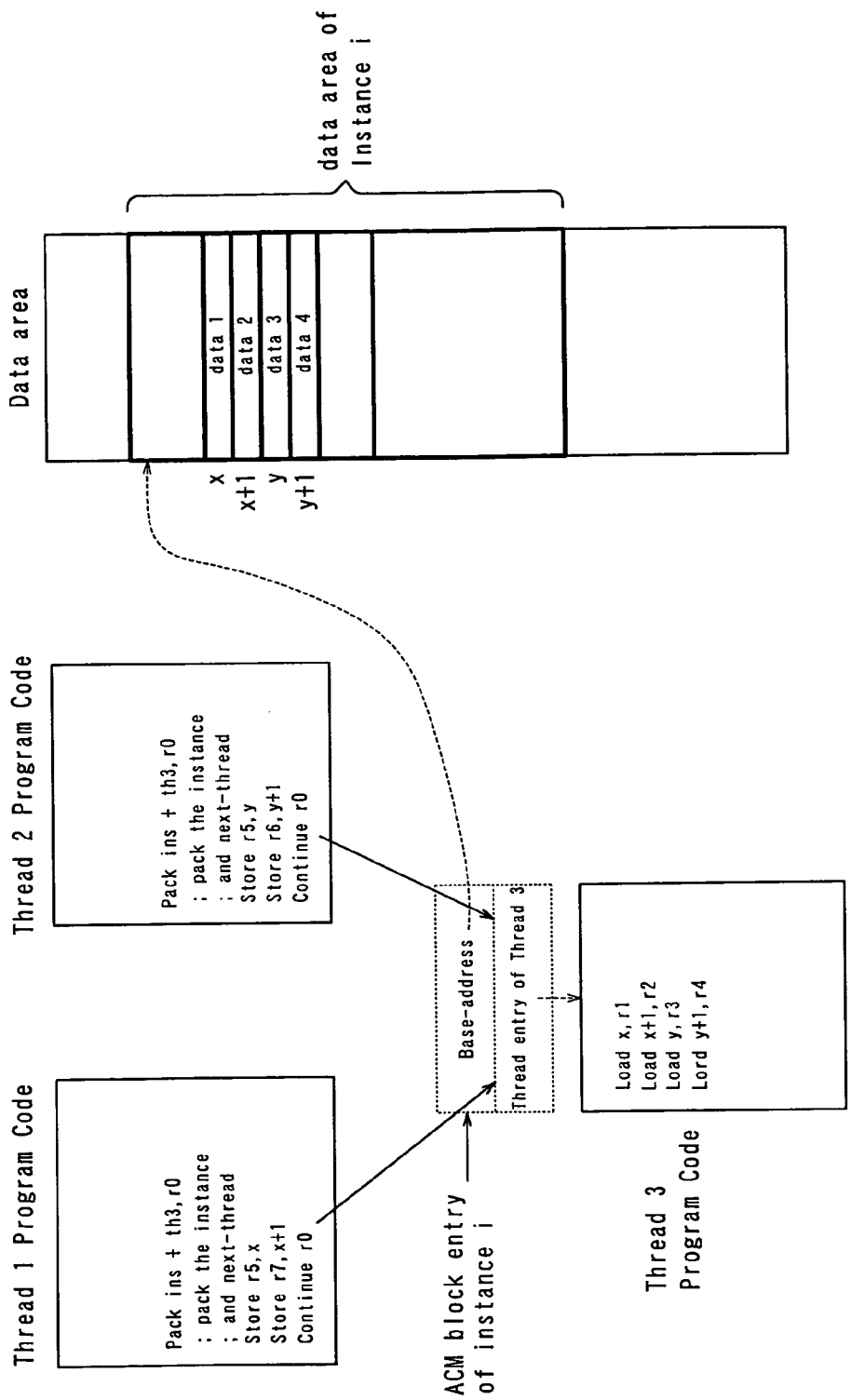
FIG. 8 is a diagram illustrating an exemplary operation of the control transfer and the data passing among the threads in the parallel processing computer according to the present invention.

FIG. 8 is a diagram illustrating an exemplary operation of the control transfer and the data passing among the threads in the parallel processing computer according to the present invention. As shown in FIG. 8, when Thread 1 and Thread 2 tries to continue to Thread 3 , data included in registers r5 and r7 in Thread 1, and data included in registers r5 and r6 in Thread 2 are passed to Thread 3. If these threads are supposed to be executed now in an instance i, the data area which is assigned or allocated to the instance i can be accessed. Because this data area is attained as a region necessary for this instance execution at the time of the instance generation and is given as a base address value of ACM block i. Code of Thread 1 stores the values of registers r5 and r7 into addresses x and x+1 in the data area of instance i, respectively. Also, code of Thread 2 stores the values of registers r5 and r6 into addresses y and y+1 in the data area of instance i, respectively. Finally, code of Thread 3 loads into registers r1 , r2, r3, r4 from x, x+1, y, the y+1 address in the data area of instance i, respectively Accordingly data of Thread 1 and Thread 2 is successfully transferred to Thread 3.

Embodiments of a parallel process mechanism in a parallel processing computer according to the present invention will be explained below. The parallel process mechanism is a technique for dynamically handling a plurality of processes (or sub-routines, functions) in parallel. The execution of the program code of the gathered units such as sub-routines and functions are generally called a "process" and each executed process is called an instance, especially. In the parallel processing environment, the concept of the process execution is essential. For example, in order to realize a conventional parallel processing such as in an operating system, different blocks of process data and/or different resources must be processed or handled concurrently and in parallel while sharing the same program code. This is generally called "operation of a parallel process".

In this invention, because it handles some gathered program unit as a thread program, a dynamically started process (or a function) is called an "instance" and the program execution is called "execution of an instance". Because the present parallel processing computer further deals with subroutines and functions, it is assumed that the term "instance" includes subroutines and functions. During execution of a certain instance, the instance starts up the other instance. A instance which activates others is called a parent instance (or caller)

and a started instance is called a child instance (or callee). In the processing of the parallel instance, a plurality of instances are started up and is concurrently executed. At this parallel processing, a plurality of instances must not interfere with each other while they are executed independently. Therefore, respective execution environments of the instances must be handled separately and are managed independently. When the instance in execution tries to activate a child instance, the instance in execution generates an execution environment (e.g., work areas and the like) dynamically before execution of the child instance and the generated execution environment disappears if the execution ends.

Control of execution of such a parallel instance will be explained below.

Control of the Routine (or Function) Call

Figure 9:
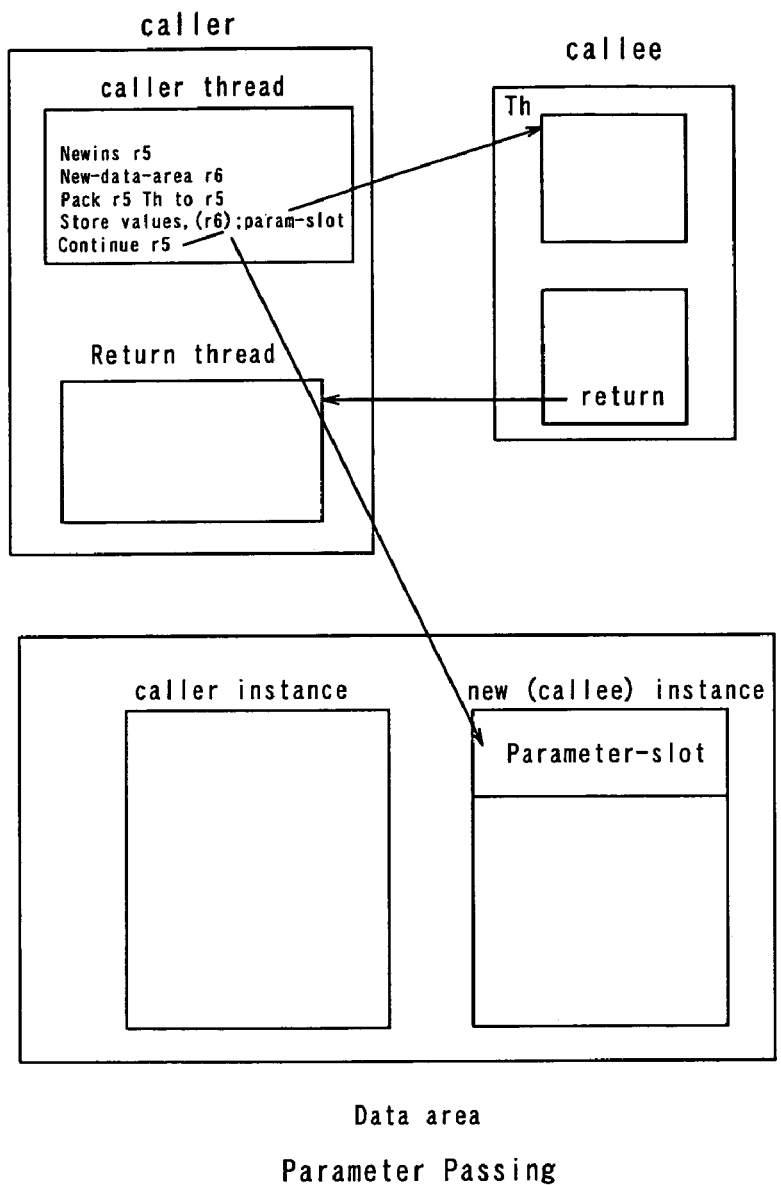
FIG. 9 is a diagram depicting an exemplary macro instruction which activates the routine (function) and a exemplary parameter passing method supported by the parallel processing computer according to the present invention.

FIG. 9 is a diagram depicting an exemplary macro instruction which activates the routine (function) and a exemplary parameter passing method supported by the parallel processing computer according to the present invention.

First, the outline of the control is described using macro instruction "call". Hereinafter, a routine (or a function), which calls others, is called a "caller" and a routine (or a function), which is called by others, is called a "callee".

Macro instruction "call" specification is given as follows.
Call func, param, cur-ins, cont, retval The parameter is as follows:
func: callee instance+callee function name (Note: +symbol means a concatenation operator)
param: parameter slot address
cur-ins: caller instance
cont: caller side continuation thread
retval: pointer to caller side return value receive slot (1) A callee function name is given as a code address of the top thread of callee. Callee instance and callee function name are packed in Func. The execution of callee is begun from the top thread.
(2) Argument data is written in the data area on the side of callee. The address is given as a parameter-slot address and is delivered to callee.
(3) Cur-ins is an instance of caller and this is used for the return to caller from callee.
(4) Cont is an entry of the thread code which starts up when returned from callee.
(5) Retval is an address of the return value receipt slot which is prepared on the side of caller. A return value is stored in this slot by the callee.

The operation of the call instruction is as follows:
1. A child instance is generated on the occasion of execution of the thread program at the callee side. In the generation of the instance, an ACM block is allocated and an original value of the thread code which included in the thread program is loaded in each thread entry of the ACM block. (An original value(s) of each thread code in the embodiment described above is disposed in a thread table by a program loader.)

In order to implement this macro in the form of a hardware, there is provided a "new-instance" instruction (which is called new-ins) which performs following steps.
(A) A free block of the ACM is secured or reserved, and then the block number, at which the free block is reserved, is returned as a return value or code (block number=instance number). Access to the ACM block is done using this return value.
(B) Following value are inserted into the obtained ACM block in the step (A).
Base address is placed in the header of the ACM block.

link information (Fan-in value and thread code entry address), which is prepared for each thread, is stored in each thread entry.
2. Control is transferred from the instance, which is being executed, to the child instance which is generated therefrom using a continue instruction. At this moment, an operand of the continue instruction is given by both an instance number of the child instance (callee instance), which is newly generated, the instance, which is being executed, and an entry of a top thread code (callee function name), which is to be executed by the child instance (Information [callee-instance+callee-name-name], which includes the above described data as a packed from, is stored in an arbitrary register by user). In addition, parameter, which is to be transferred to the child instance, is stored in a data area for a child instance using a store instruction, which is in the program of the parent instance (caller instance).
3. A thread program is executed in the child instance (callee instance). In order to execute the thread code or program in the child instance, a control is transferred from the current running thread to the continuation thread by a continue instruction. All instances in this case are child instances (callee instances).
4. A control transfer (return processing) from the child instance to the parent instance (caller instance) is also performed by a continue instruction. At this moment, an instance is changed from the child instance (callee instance) into the parent instance (caller instance). A continuation thread is given as a return thread (caller side continuation thread) which has been passed from the parent instance at the time of Call.
5. When the execution of the child instance completes, the instance (the ACM block) is released by delete-instance instruction (del-ins).

Macro instruction "Call" is realized by executing following primitive instructions:

1. Execution of New-Ins Instruction
An instance is generated (i.e., allocating of an ACM block for the instance). Allocated or assigned ACM block number is returned to a register which has been specified at the call.

2. Execution of the New-Data-Area Instruction
A data area (New instance data area) for the instance is allocated. A memory manager reserves a new data area (i.e., new instance data area) and a base address of the reserved data area is returned to a specified register.

3. Store Processing
The information, which is to be delivered to callee is an return-value-slot address (i.e., retval), [caller-instance+caller-side-continuation-thread] and parameters. [caller-instance+caller-side-continuation-thread] and parameters are written in a parameters slot in the allocated data area.
An address of retval is stored in parameters slot.
These arguments or parameter information is stored in parameters slot beforehand.

4. Execution of Contiune Instruction
Using a parameter address of New instance data area as an argument, the control is transferred to [callee-instance+callee-function-name(thread name)].

FIG. 10 is a diagram representing an exemplary return control from the routine (function) of the parallel processing computer according to the present invention.

The outline of the control of the return to caller from callee is shown below using macro instruction "Return".
Macro instruction: Return retins cont-thread, retval
The operands are as follows.

retins: it is a caller instance used for return to an instance environment on the caller side.

cont-thread: it is a return thread, that is, a code entry of the thread in the caller side, and in the return place, the thread which was specified by the "cont" is driven.

retval: it is a return value slot, that is, an address of the return value slot which maintains a return value. In other words, the return value is stored in the return value slot, which is prepared in the caller side.

Return processing is performed using following primitive instruction:

(i) Execution of Store Instruction

A storing process of a return value: A store instruction writes a return value into return value slot in the data area on the side of caller.

(ii) Execution of Continue Instruction

It perfumes a control transfer to [caller instance+return thread].

(iii) Execution of the Del-ins Instruction

It releases a current instance.

Figure 11:
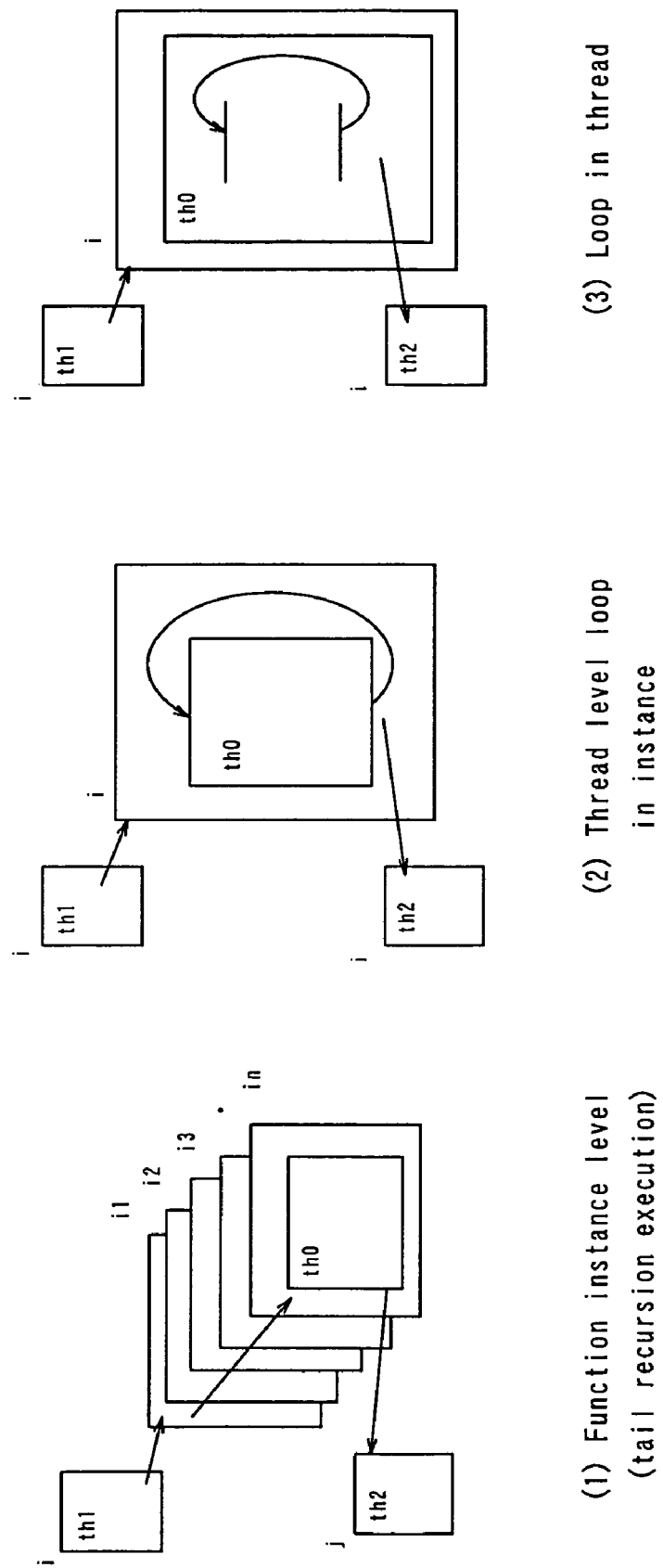
FIG. 11 is a concept diagram showing exemplary repeating executions of programs of the parallel processing computer according to the present invention.

A program structure and the execution mechanism of repeating execution will be explained below. There are three ways in the operation of the repeating execution as follows:
1. Function instance level
2. Thread level in an instance
3. Loop in a thread FIG. 11 is a concept diagram showing exemplary repeating executions of programs of the parallel processing computer according to the present invention. The above-mentioned three methods will be explained in detail with reference to figures.

1. Function Instance Level

This method is done by the execution of a recursive function. In the computer according to the invention, it is possible to execute a usual recursive function in generating a function instance newly every recursion with the ways mentioned above. However, as for just as it is, it is necessary to generate an instance every recursion and it consumes an enormous instance. Although in the execution of the recursive function, a conventional existing processor uses a stack instead of the instance, a problem like that of this method arises because enormous stack memory is consumed.

Generally, it is known that a tail recursion function, which does recursive call at the tail of the function body, can be converted into a program structure of the loop execution by a compiler. The exemplary way, according to the present invention, of direct controlling a tail recursion function with the loop without changing into the loop execution program structure by the compiler will be explained below.

FIG. 12 is a diagram illustrating an exemplary delegation of control and an exemplary execution of loop of the parallel processing computer according to the present invention. As shown at (a) in FIG. 12, firstly, the activation of a recursive function (the body is th0) is performed by a thread th1 of an instance i. At this moment, [i+th2] is delivered to this function as an argument. (This means making a place of the return from the recursive function the continuation thread (th2) of the instance i.) The function is executed in an instance i1, and the function body th0 performs a recursion at the end thereof (i.e., starting itself up once again) using [i+th2] as an argument. At this moment, because the instance i1 becomes unnecessary, it is released at once. The recursion execution moves ahead only about the necessary steps while delivering the return place [i+th2] in the similar fashion and, finally, the execution is continued or connected to the return place [i+th2]. (This is the "delegation of control" and is a reason for naming.) Each instance which was generated every recursion is to be released every time the recursion start-up happens, and it can be released. By this delegation technique, finish-running thread execution can be realized.

2. Thread Level in an Instance

The above-mentioned technique of delegation of control in the function instance level, as shown in FIG. 12, can be optimized. Although, in such technique of delegation of control an instance is newly generated every recursion activation, if an instance i in the activation or caller side can be reused as it is instead of generating a new instance, it is no need for generating a new instance. This structure, in which the control transfers to the continuation thread in the identical instance, is called thread loop execution method in an instance.

3. Loop in a Thread

As shown at (b) of FIG. 12, the loop in a thread is a loop execution using a jump instruction placed in the thread. This is a loop execution method like a conventional program in the past. Accordingly, when only one thread code is repeatedly reused, the instance administration can be reduced by using the same instance and to improve the throughput of the processor.

Next, an embodiment of a controlling mechanism of the asynchronous exclusion control among the threads will be explained below. That is, the mechanism, which realizes exclusive access control to shared resources in the operating system or the like is described. This mechanism is indispensable to realize a practical concurrent processing system.

In the loop execution of the above-mentioned thread level in the instance, this thread level loop has no trouble only if the loop execution is a normal process (like an operation in single process) such that the loop execution is activated from only one instance and it doesn't start interference with the others. However, when trying to realize a shared resource exclusive control (which is called "critical region problem") in the operating system and so on, the thread itself, which does this thread level loop execution, should be shared. Therefore, the exclusive control of this thread becomes necessary.

Figure 13:
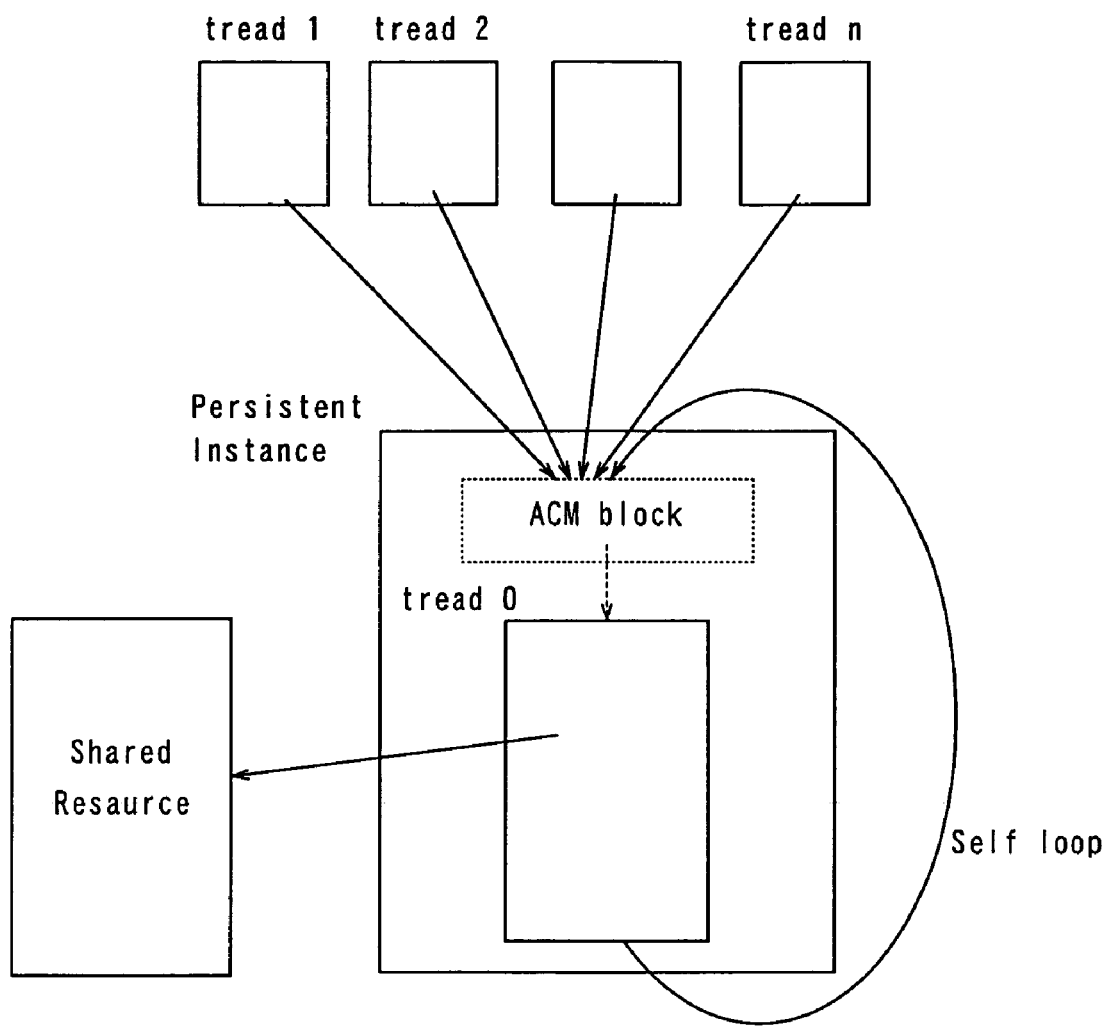
FIG. 13 is a concept diagram representing an exemplary exclusive control of the parallel processing computer according to the present invention.

FIG. 13 is a concept diagram representing an exemplary exclusive control of the parallel processing computer according to the present invention. A thread0 performs a thread level loop.

A system routine or kernel generates an instance when system is activated, and the instance is persistent instance and continues to exist until the system terminates. It is assumed that fan-in of thread0 is two, one is for continuation from itself and other one is for continuations from a plurality of instances such as Thread1, Thread2, . . . , Thread n, which are being executed in parallel. At this moment, only one thread of Thread1, . . . , Thread n can be permitted to exclusively continue to Thread0 and others are made to wait until the execution of Thread0 finishes and performs a recursion. For example, such a situation occurs in various parallel process controls such as a reading and writing operation (readers-writers) problem to and from a shared memory, a producer-consumer problem and queuing management.

This exclusive control is realized by following three methods.

The first method is a technique, which uses Wait-and-Continue instruction in (3) and Reset-and-Continue instruction of control transfer instructions (continue instruction) to continuation thread as described in the above-mentioned embodiment.

The second method is a technique, which utilizes Test-and-lock instruction and Reset-and-Continue instruction, which operates the above-mentioned lock bit (Lock-bit).

The third method is a technique combining the first method and the second method. The lock interval can be set as small as possible by this method. These three methods will be explained in detail later.

The Test-and-lock instruction and the unlock instruction, which are executable with the parallel processing computer according to the present invention, i.e. is supported with this computer, will be described below.

FIG. 14 is a diagram depicting an exemplary specification of the Test-and-lock instruction and Unlock instruction, which are supported by the parallel processing computer according to the present invention (1) Test-and-Lock Instruction A Lock-bit (i.e., a flag for the lock) of a thread entry [instance+thread-name]) in the ACM block, which corresponds to a continuation thread specified in an operand, is checked, and if a lock-bit is on (locked), to be made wait until the lock is released. If Lock-bit is off (i.e., unlocked) lock-bit is set to "on" immediately and it ends operation.

Alternatively, as the specification of the Test-and-lock instruction, another specification can be specified. In another specification of this instruction, an operand is given as an arbitrary register, and when lock-bit is on (locked) in the operation of the Test-and-lock instruction, zero is stored in the arbitrary register instead of waiting and the operation ends. When Lock-bit is off, lock-bit is set to "on" at once, value of one is stored in the register and the operation ends. Accordingly, in this alternative way, the process never be in a busy-wait while the Test-and-lock instruction works.

The control of "busy wait" is performed by checking the value of register on the program side, instead. When continuing to a thread, which exclusively executes from a plurality of instance, each continuation request is handled in exclusive control by using Test-and-lock instruction in each instance thread.

(2) Unlock Instruction

A Lock-bit of the thread entry ([instance+thread-name]) in the ACM block corresponding to a continuation thread, which is specified by the operand is set to "off" (unlocked). It is noted that Reset-and-Continue instruction also sets Lock-bit to "off".

Three embodiments of performing an exclusive control using the above-mentioned instructions, which are supported with the parallel processing computer according to the present invention, will be explained below.

Figure 15:
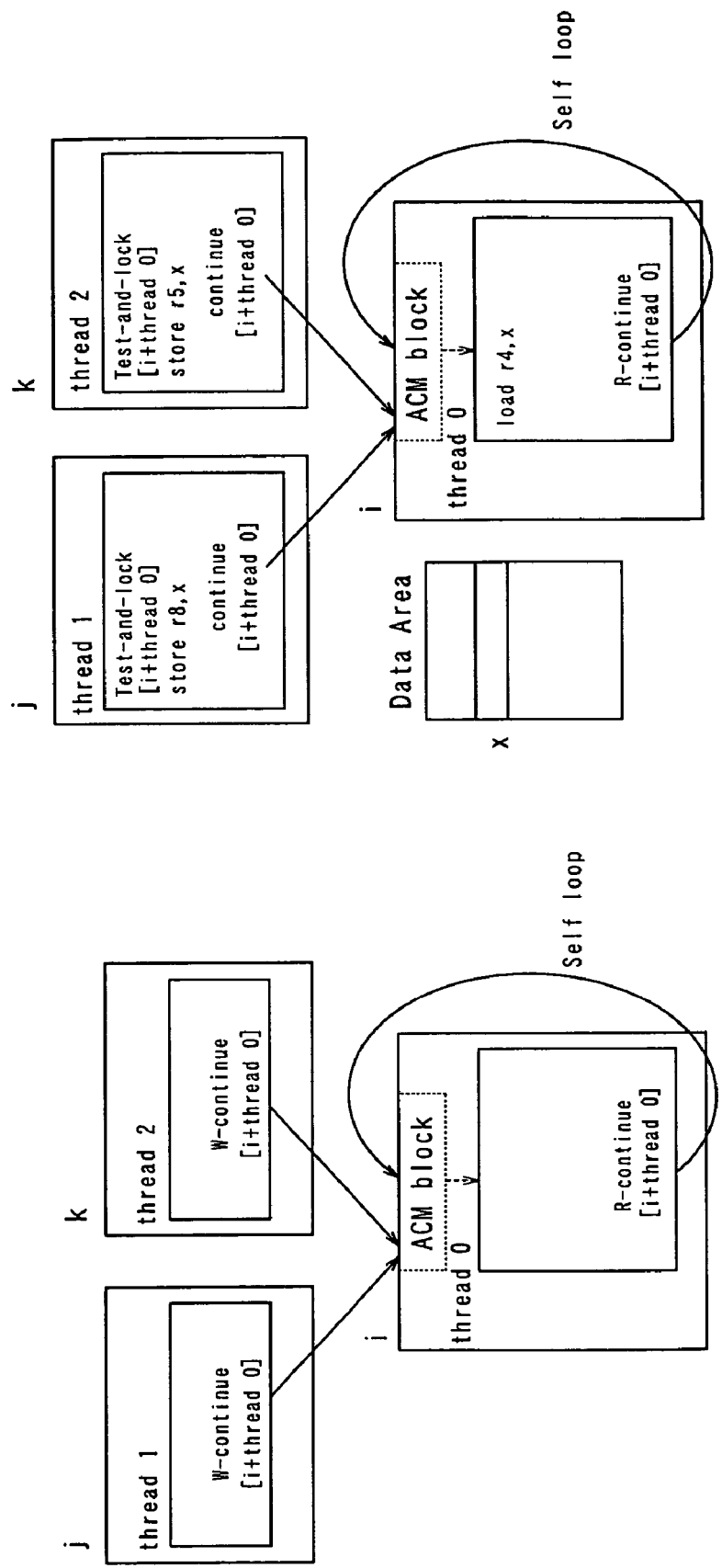
FIG. 15 is a diagram showing exemplary first and second exclusive control methods of the parallel processing computer according to the present invention.
Figure 16:
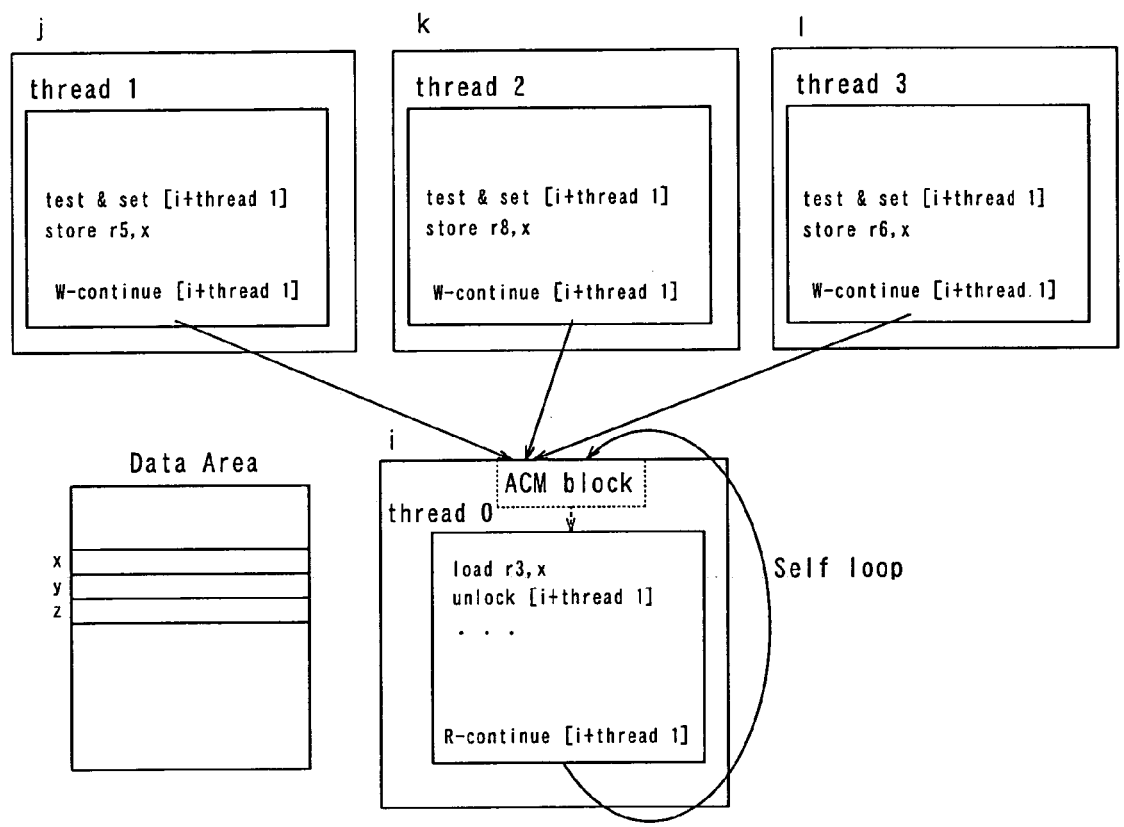
FIG. 16 is a diagram illustrating an exemplary third exclusive control method of the parallel processing computer according to the present invention.

FIG. 15 is a diagram showing exemplary first and second exclusive control methods of the parallel processing computer according to the present invention and FIG. 16 is a diagram illustrating an exemplary third exclusive control method of the parallel processing computer according to the present invention.

First Exclusive Control Method

As shown at (a) in FIG. 15, Instances i, j and k are working (instance i is a permanence instance) concurrently and this figure illustrate a status that instances j and k continue respectively from thread1 and thread2, to thread0 of instance i. At this moment, the exclusive control becomes necessary because instance i is in the critical region in which control each instance must be operated exclusively. It is supposed that instances j and k try to continue to instance i at about the same time and they execute Wait-and-Continue instruction respectively. Because the execution itself of this instruction is exclusive (Atomic operation), either i or j (for instance, j) accesses an ACM block and the concerned synchronous count is decremented by one. As a result, when a synchronous count is equal to zero (sync-count=0), thread0 begins execution. At this moment, because the synchronous count becomes zero already, the instance k is forced to wait within TAC until a value of synchronous count is reset to a fan-in value. Because the value of synchronous count is set to the fan-in value when executing Reset-and-Continue instruction after the execution of thread0 of the instance i ends, the wait of k is released in this stage.

Second Exclusive Control Method

As shown at (b) in FIG. 15, instances i, j and k are working concurrently and this figure illustrate a status that instances j and k continue respectively from thread1 and thread2, to thread0 of instance i like the case of the first way. This figure further illustrates a status that a data area is used as shared resources, and that the instance j and k stores respective results of them into an address "x" in the data area respectively, and that thread0 of the instance i loads the respective results from "x" and to do processing to each result. At this moment, the store operation to x must be exclusive. Therefore, in the second method, the region where store and load operation is performed is made to a critical region by Lock-bit operation and thus the lock operation works. The instances j and k check the lock-bit by the Test-and-lock instruction before storing to x, if the lock-bit is unlocked the bit is immediately locked, and a data is stored in x using a store instruction, and each instance continues to the thread0 of instance i by executing a continue instruction. Supposing that thread1 of the instance j executes Test-and-lock instruction earlier, the thread1 can execute an instruction "store r8, x" and thus the data of r8 is stored in x, and finally the execution continues to the instance i. On the other hand, when the thread 2 of instance k tries to execute Test-and-unlock instruction to continue, it is forced to wait until the bit is unlocked, because the lock-bit is locked, and thus the store instruction is procrastinated or delayed. When the execution continues to the instance i from the instance j, thread0 executes an instruction "load r4, x" and thus data is loaded from x and the result of instance j is processed. When thread 0 executes a Rest-and-Continue instruction, Lock-bit is unlocked. As a result, lock cancellation wait by instance k is solved and after the result of instance k is stored into x by the execution of an instruction "store r5, x", the execution continues to the instance i. As shown at (a) and (b) in FIG. 15, the thread0 of the instance i continues to itself (self-loop), and continuation requests from the instance threads j-thread1 and k-thread2 are serialized.

Third Exclusive Control Method

In the second method, the critical area is within a time interval from when the lock-bit is locked by a Test-and-lock instruction to when a lock is solved by a Reset-and-Continue instruction. Since in the second method described above situation of long lock interval may occur, the parallel processing does not work properly in the second method.

The third method is a technique of holding a lock interval at the necessary minimum level. As shown at (c) in FIG. 16, this method uses lock-bit operation by using a Test-and-unlock instruction and an Unlock instruction to exclusively control access to a shared resource, and utilizes a Wait-and-Continue instruction and a Reset-and-Continue instruction to exclusively control a continuation to an instance i. In instances j, k and l, a Test-and-lock instruction is executed to lock immediately prior to store instruction execution to a shared memory x, and in an instance i, an Unlock instruction is executed to release the lock immediately after a load instruction execution. In the instances j, k and l, a Wait-and-Continue instruction is executed to continue exclusively to a thread0 of the instance i, and the thread0 executes a Resetand-Continue instruction when it continues to itself and it accepts the continuation request which is in the wait condition.

According to the third method, the lock interval about shared resources is narrowed between the Test-and-lock instruction and the Unlock instruction and the critical region can be suppressed to the necessary minimum level. Although the exclusive control can be performed using only lock manipulation, this method further utilizes Wait-and-Continue instruction and Reset-and-continue instruction to further narrows the lock interval.

Figure 17:
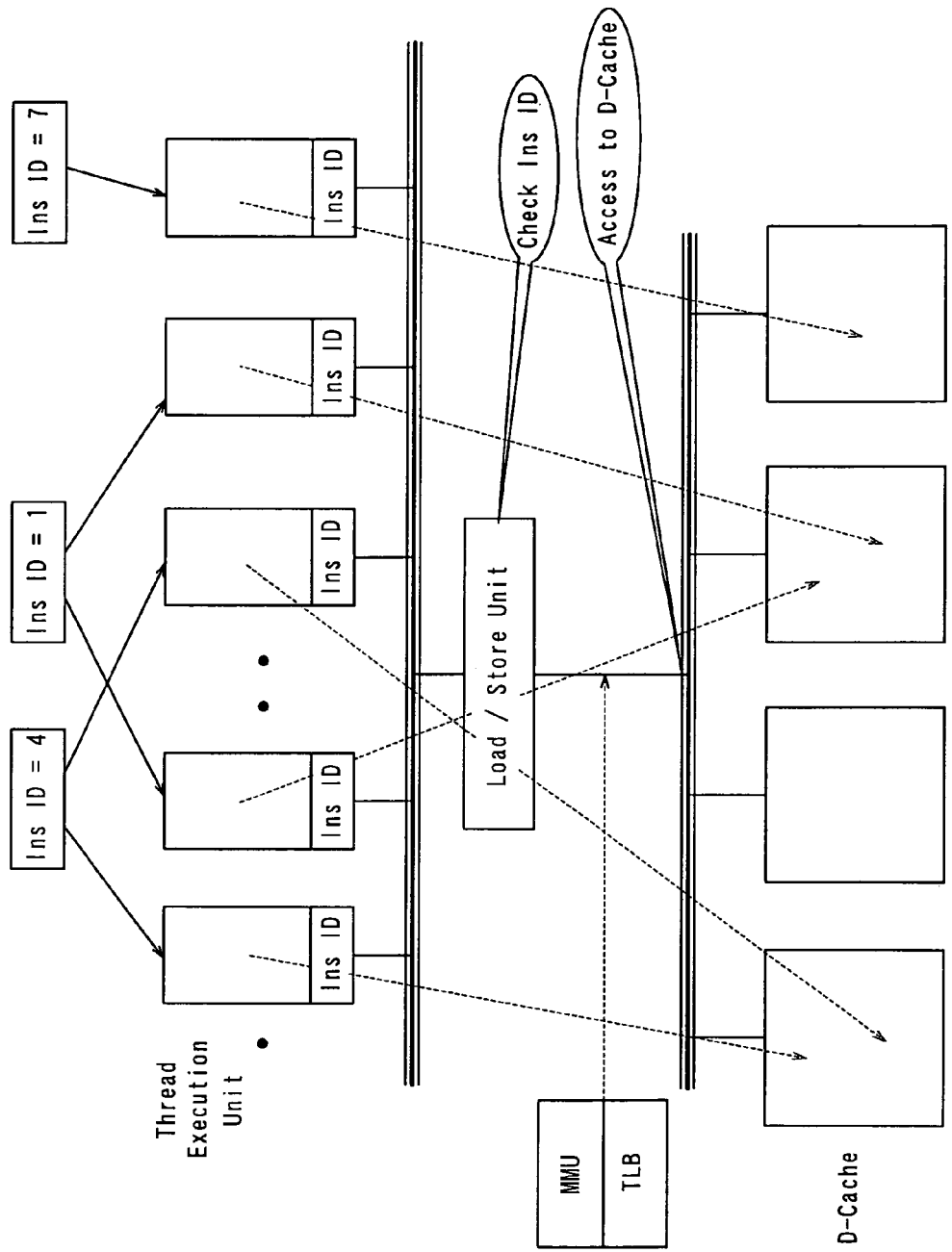
FIG. 17 is a conceptual diagram depicting the concept of the data cache (D-Cache) control supported by the parallel processing computer according to the present invention.

FIG. 17 is a concept diagram depicting the concept of the data cache (D-Cache) control supported by the parallel processing computer according to the present invention. As shown in FIG. 17, D-Cache comprises four banks and respective banks are accessed using lower three bits. Following configuration and step are necessary for D-cache control.

(1) There is provided internal registers InSID1, InSID2, which maintain the lowest (or the highest) n bits of the respective instance IDs of the preceding thread and the current executing thread for each thread execution unit (EU).
(2) D-Cache includes a plurality of $2^n$ banks and when each EU tries to access to cache, D-cache bank to be accessed is determined by the value of InSID1 or InSID2.

The above-mentioned data cache control will be described in detail below.
1. The value in the lowest (or the highest) "n" bits (that is a bank number of D-Cash and hereinafter which is called Cache-bank Number) of an instance number in the current running thread is passed to the continuation thread.
2. The pre-load unit takes out the Cache-bank Number from the continuation thread in the ready-thread queue and accesses to the concerned D-Cache bank.
3. It sets the lowest (or the highest) n bit of the current instance number and Cache-bank Number in InSID1 and InSID2 respectively when execution of continuation thread starts.
4. When loading any data from the memory (or cache) in the thread execution, D-cache bank number is passed to a load/store control unit (LSC) to access D-cache. The LSC accesses a concerned D-cache bank with reference to the passed D-cache number.
5. The procedure of the cache control by steps 2 and 4 takes a method like a usual method (e.g., RISC machine).
6. When accessing to the memory for storing any data, the same operation as the step 3 is performed using InSID2, which maintains the instance number of the current execution thread, which is being executed.

In this data cache method when execution is performed over the threads, an instance number is taken over to a subsequent stage(s) or thread(s), and thus the locality of the data access can be maintained through the threads. Accordingly, when a continuation thread loads any data, which has been stored by the preceding thread, cache hit rate can be improved by using a cache bank(s), which corresponds to the instance of the preceding thread.

INDUSTRIAL APPLICABILITY

The present invention provides a fundamental technique regarding the parallel processing computer and its configuration based upon a new concept utilizing the principle of multi-thread process. Therefore, this technique is applicable generally as a basic technique of the parallel distributed processing computer for the various parallel distributed processing. For example, the present invention is used for the application of the various parallel and the distributed processing as a parallel processing computer or a terminal computer of network, which is installed in the network node, and which does transaction processing with all kinds such as the message processing and the transfer. While the present invention has been described with respect to some embodiments and drawings, it is to be understood that the present invention is not limited to the above-described embodiments, and modifications and drawings, various changes and modifications may be made therein, and it is intended to cover in the appended claims all such modifications as fall within the true spirit and scope of the invention.

What is claimed is:

1. A parallel processing computer for executing a plurality of threads concurrently and in parallel, said computer comprising:
    a thread activation controller for determining whether or not each of threads, which are exclusively executable program fragments, is ready-to-run, and to put the thread determined ready-to-run into a ready thread queue as ready-to-run thread; and
    a thread execution controller having a pre-load unit, an EU (Execution Unit) allocation and trigger unit, a plurality of thread execution units and a plurality of register files including a plurality of registers,
    and wherein the pre-load unit, prior to when each ready-to-run thread in the ready thread queue is executed, allocates a free register file of the plurality of register files to the each ready-to-run thread, to load initial data for the each ready-to-run thread into the allocated register file,
    and wherein the EU allocation and trigger unit, when there is a thread execution unit in idle state of the plurality of thread execution units, retrieves ready-to-run thread from the top of the ready thread queue, and to allocate the retrieved ready-to-run thread to the thread execution unit in idle state, and to couple the register file loaded the initial data for the ready-to-run thread with the allocated thread execution unit in idle state, and to activate the ready-to-run thread,
    and wherein the plurality of thread execution units execute the activated threads concurrently in parallel; and
    wherein the thread activation controller comprises synchronous control memory,
    and wherein the synchronous control memory has blocks for every instance, each block having both a count field for synchronously activating thread and a preceding-thread number field in which preceding thread number is previously stored therein for each thread.

2. The parallel processing computer according to claim 1, wherein the plurality of thread execution units are coupled to instruction caches, each of which is dedicated to each thread execution unit, respectively,
    and wherein the parallel processing computer further comprises a first memory manager, said first memory manager, before ready-to-run thread is triggered, loading the code of the ready-to-run thread into the instruction cache from the memory.

3. The parallel processing computer according to claim 1, further comprising data caches,
    and wherein the pre-load unit accesses the data caches before accessing the memory, and if data for executing is found in any of the data caches the pre-load unit loads the found data for executing from the data caches.

4. The parallel processing computer according to claim 3, wherein the data caches include a plurality of memory banks, and wherein the parallel processing computer further comprises a second memory manager, and wherein the second memory manager, when executing each thread if there is any memory bank of the data caches which was used by the thread which precedes the each thread, is controlled to use the any memory bank.

5. The parallel processing computer according to claim 1, wherein the thread activation controller sets preceding thread number, which is set in the preceding-thread number field as an initial value, in the count field, to decrement the value in the count field by one when each activation notice is received, and to determine that the thread is ready-to-run if the value reaches zero.

6. The parallel processing computer according to claim 4, wherein the thread activation controller sets preceding thread number, which is set in the preceding-thread number field as an initial value, in the count field, to decrement the value in the count field by one when each activation notice is received, and to determine that the thread is ready-to-run if the value reaches zero.

7. The parallel processing computer according to claim 5, wherein each block of the synchronous control memory further has a lock flag, and wherein the plurality of thread executing unit supports both a lock instruction for locking the lock flag and a unlock instruction for unlocking the lock flag.

8. The parallel processing computer according to claim 1, further comprising:

at least one exclusive control thread capable of accessing at least one shared resource;

an exclusion continuation controlling mechanism for controlling exclusion continuation to the at least one exclusive control thread; and exclusion access control means for controlling exclusion access to the at least one shared resource.

9. The parallel processing computer according to claim 6, wherein each block of the synchronous control memory further has a lock flag, and wherein the plurality of thread executing unit supports both a lock instruction for locking the lock flag and a unlock instruction for unlocking the lock flag.

* * * * *